(12) United States Patent
Khalil et al.

(10) Patent No.: US 9,970,819 B2
(45) Date of Patent: May 15, 2018

(54) HIGH PERFORMANCE PARALLEL SPECTROMETER DEVICE

(71) Applicant: Si-Ware Systems, Cairo (EG)

(72) Inventors: Diaa Khalil, Cairo (EG); Bassam A. Saadany, Nasr (EG); Yasser M. Sabry, Nasr (EG)

(73) Assignee: Si-Ware Systems, Cairo (EG)

( * ) Notice: Subject to any disclaimer, the term of this patent is extended or adjusted under 35 U.S.C. 154(b) by 0 days. days.

(21) Appl. No.: 15/009,755

(22) Filed: Jan. 28, 2016

(65) Prior Publication Data

US 2016/0282184 A1   Sep. 29, 2016

Related U.S. Application Data

(60) Provisional application No. 62/137,165, filed on Mar. 23, 2015.

(51) Int. Cl.
| | |
|---|---|
| *G01J 5/02* | (2006.01) |
| *G01J 3/45* | (2006.01) |
| *G01J 3/10* | (2006.01) |
| *G01J 3/02* | (2006.01) |
| *G01J 3/26* | (2006.01) |
| *G01J 3/453* | (2006.01) |

(52) U.S. Cl.
CPC ............... *G01J 3/45* (2013.01); *G01J 3/0256* (2013.01); *G01J 3/108* (2013.01); *G01J 3/26* (2013.01); *G01J 3/453* (2013.01); *G01J 3/4531* (2013.01); *G01J 3/4532* (2013.01); *G01J 3/4535* (2013.01)

(58) Field of Classification Search
CPC .......... G01J 3/45; G01J 3/0218; G01J 3/4535; G01J 3/4531; G01J 3/0237; G01J 3/0294; G01J 3/26; G01J 3/2803; G01J 3/28

USPC ...................................................... 250/339.01
See application file for complete search history.

(56) References Cited

U.S. PATENT DOCUMENTS

| | | | |
|---|---|---|---|
| 4,309,108 A * | 1/1982 | Siebert .................. | G01J 9/0246 356/519 |
| 4,848,904 A | 7/1989 | Sapp et al. | |
| 4,848,906 A * | 7/1989 | Layton .................. | G01H 9/004 250/227.19 |
| 5,184,195 A * | 2/1993 | Goldner ............... | G01C 19/728 356/462 |
| 5,206,924 A * | 4/1993 | Kersey .................. | G01D 5/344 250/227.27 |

(Continued)

OTHER PUBLICATIONS

Khalil et al, "Miniaturized Tunable Integrated Mach-Zehnder MEMS Interferometer for Spectrometer Applications" MOEMS and Miniaturized Systems IX; (2010) vol. 7594, 75940T; 13 pages.

(Continued)

*Primary Examiner* — Taeho Jo
(74) *Attorney, Agent, or Firm* — Loza & Loza, LLP; Holly Rudnick

(57) ABSTRACT

A spectrometer with increased optical throughput and/or spectral resolution includes a plurality of interferometers coupled in parallel. An optical splitter divides a source light beam into a plurality of input beams and directs each of the input beams to a respective one of the plurality of interferometers. One or more detectors are optically coupled to receive a respective output from each of the plurality of interferometers and is configured to detect an interferogram produced as a result of the outputs.

26 Claims, 13 Drawing Sheets

(56) References Cited

U.S. PATENT DOCUMENTS

| | | | | |
|---|---|---|---|---|
| 5,208,685 A * | 5/1993 | Aleksoff | G01R 23/17 | 250/208.1 |
| 5,262,842 A * | 11/1993 | Gauglitz | G01N 21/7703 | 356/477 |
| 5,355,243 A * | 10/1994 | King | H04B 10/61 | 398/203 |
| 5,392,117 A * | 2/1995 | Belleville | G01D 5/266 | 250/227.27 |
| 5,422,721 A * | 6/1995 | Ryan | G01J 3/4535 | 356/451 |
| 5,777,736 A * | 7/1998 | Horton | G01J 3/453 | 356/456 |
| 5,909,297 A * | 6/1999 | Ishikawa | H04L 7/0037 | 398/198 |
| 6,016,199 A * | 1/2000 | Newton | G01J 3/26 | 356/454 |
| 6,144,449 A * | 11/2000 | Knuettel | G01N 21/4795 | 356/450 |
| 6,433,715 B2 * | 8/2002 | Prucnal | H03M 1/121 | 341/137 |
| 7,068,372 B1 * | 6/2006 | Trisnadi | G02B 6/29311 | 356/450 |
| 7,301,643 B2 | 11/2007 | Kenda et al. | | |
| 8,792,105 B2 * | 7/2014 | Khalil | G01J 3/0256 | 356/497 |
| 2003/0016901 A1 * | 1/2003 | Cormack | G01J 3/0218 | 385/15 |
| 2003/0142981 A1 * | 7/2003 | Kanterakis | H04B 10/803 | 398/87 |
| 2004/0175190 A1 * | 9/2004 | Kanterakis | H04B 10/803 | 398/212 |
| 2006/0056845 A1 * | 3/2006 | Parsons | H04L 27/223 | 398/41 |
| 2008/0117435 A1 * | 5/2008 | Canioni | G01J 3/02 | 356/521 |
| 2009/0316160 A1 * | 12/2009 | Izatt | A61B 3/102 | 356/456 |
| 2010/0091282 A1 * | 4/2010 | Wang | A61B 5/0059 | 356/369 |
| 2010/0110443 A1 * | 5/2010 | Cheben | G01J 3/02 | 356/454 |
| 2011/0058180 A1 | 3/2011 | Khalil et al. | | |
| 2011/0176138 A1 * | 7/2011 | Khalil | G01J 3/0256 | 356/452 |
| 2011/0228279 A1 | 9/2011 | Lucey | | |
| 2011/0235045 A1 * | 9/2011 | Koerner | G02B 21/0056 | 356/451 |
| 2011/0243491 A1 * | 10/2011 | Hashimoto | G02F 1/035 | 385/3 |
| 2011/0249271 A1 * | 10/2011 | Izatt | A61B 3/102 | 356/497 |
| 2011/0304854 A1 * | 12/2011 | Li | G01B 11/0675 | 356/496 |
| 2012/0050744 A1 * | 3/2012 | Takada | G01J 3/45 | 356/451 |
| 2012/0050750 A1 * | 3/2012 | Hays | G01J 9/04 | 356/519 |
| 2012/0182552 A1 * | 7/2012 | Heidrich | G01N 21/7746 | 356/364 |
| 2013/0027711 A1 * | 1/2013 | Hajian | G01J 3/0294 | 356/451 |
| 2013/0100442 A1 * | 4/2013 | Wang | A61B 5/0059 | 356/300 |
| 2013/0194578 A1 * | 8/2013 | Niskanen | G01K 11/32 | 356/450 |
| 2013/0282083 A1 * | 10/2013 | Vertikov | A61B 5/14532 | 607/100 |
| 2014/0022546 A1 | 1/2014 | Nagai et al. | | |
| 2014/0092385 A1 * | 4/2014 | Nitkowski | G01J 3/18 | 356/326 |
| 2014/0098371 A1 * | 4/2014 | Sabry | G01J 3/0256 | 356/452 |
| 2014/0192365 A1 * | 7/2014 | Mortada | G01B 9/02015 | 356/521 |
| 2014/0320816 A1 * | 10/2014 | Abramoff | A61B 3/102 | 351/206 |
| 2014/0374604 A1 * | 12/2014 | Harada | G01N 21/85 | 250/353 |
| 2014/0375999 A1 * | 12/2014 | Okamoto | G01J 3/4531 | 356/451 |
| 2015/0292860 A1 * | 10/2015 | Podoleanu | G01B 9/02004 | 356/456 |
| 2015/0338202 A1 * | 11/2015 | Xiang | G01B 9/02028 | 356/477 |

OTHER PUBLICATIONS

Sabry et al, "Monolithic silicon-micromachined free-space optical interferometers onchip" Laser & Photonics Reviews 9 (2015), 1-24.

Marty et al, "Advanced etching of silicon based on deep reactive ion etching for silicon high aspect ratio microstructures and three-dimensional micro-and nanostructures" Microelectronics Journal 36 (2005), 673-677.

Invitation to Pay Additional Fees and Annex therefor, for PCT/US16/15819 dated May 23, 2016; 7 pages.

International Search Report & Written Opinion for PCT/US16/15819 dated Oct. 10, 2016; 20 pages.

Montgomery et al, "The metrology of a miniature FT spectrometer MOEMS device using white light scanning interference microscopy", Thin Solid Films, Elsevier-Sequoia S.A. Lausanne, CH, col. 450, No. 1, Feb. 22, 2004, pp. 79-83, XP004490685, DOI: 10.1016/J.TSF.2003.10.055.

* cited by examiner

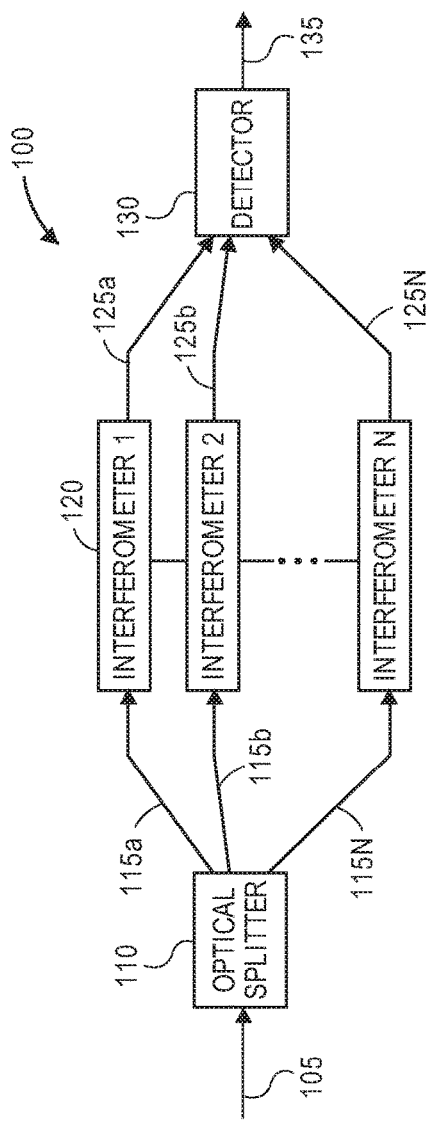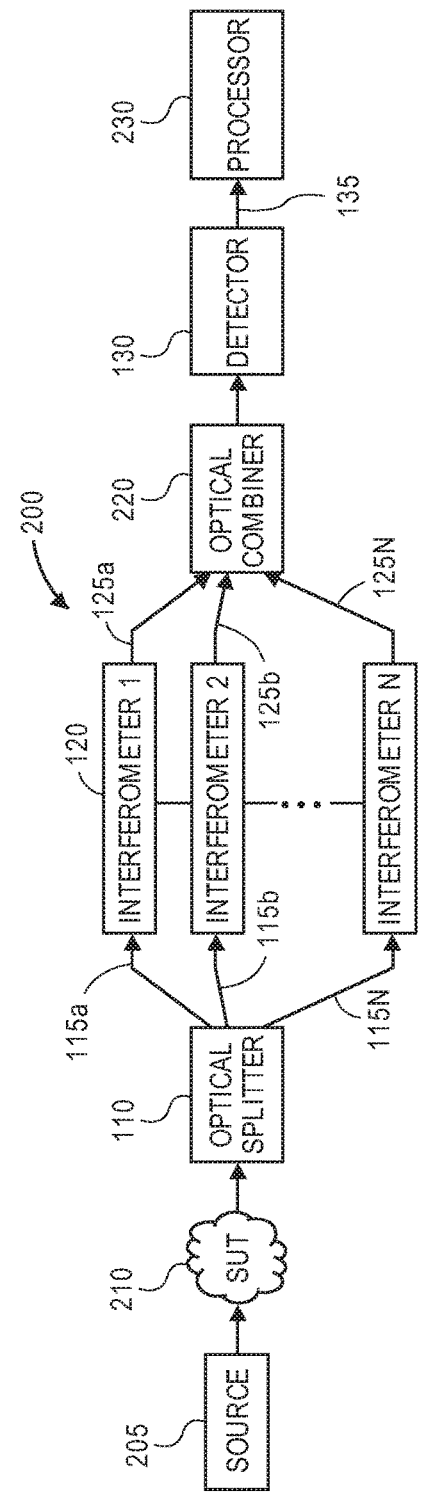

Free-space 1xN splitter

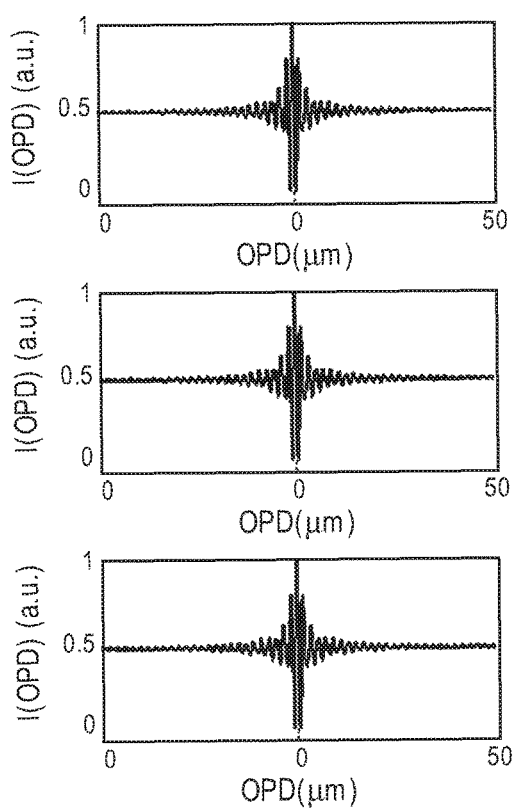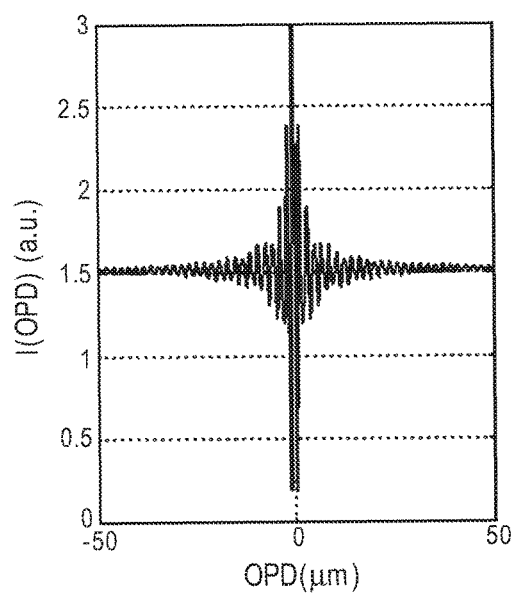
FIG. 15A  FIG. 15B

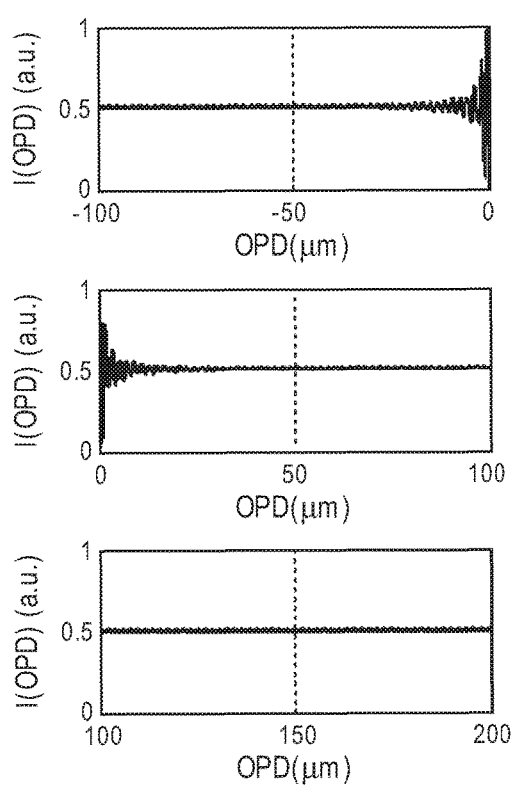 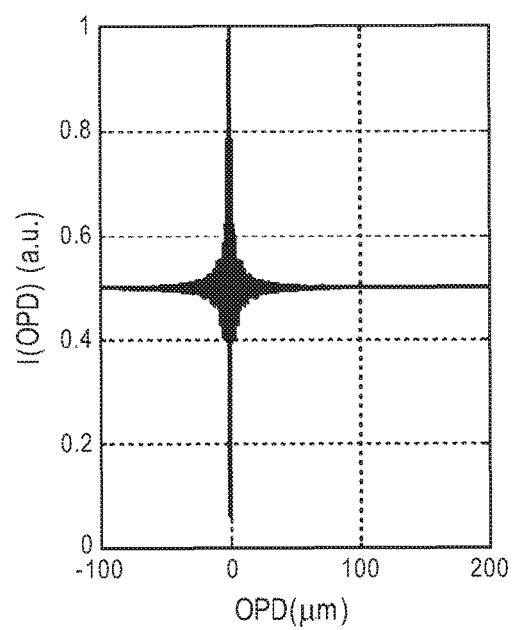
FIG. 17A  FIG. 17B

HIGH PERFORMANCE PARALLEL SPECTROMETER DEVICE

CROSS REFERENCE TO RELATED PATENTS

The present U.S. Utility patent application claims priority pursuant to 35 U.S.C. § 119(e) to the following U.S. Provisional Patent Application(s) which are hereby incorporated herein by reference in their entirety and made part of the present U.S. Utility patent application for all purposes:

1. U.S. Provisional Application Ser. No. 62/137,165, entitled "High Performance Parallel Spectrometer Device," filed Mar. 23, 2015.

BACKGROUND OF THE INVENTION

Technical Field of the Invention

Aspects of the present disclosure relate in general to optical spectrometers, and in particular to Fourier Transform Infrared (FTIR) micro spectrometers.

Description of Related Art

Absorption spectrometers measure how well a sample absorbs light at each wavelength. Most absorption spectrometers utilize a "dispersive spectroscopy" technique, but others utilize a "Fourier transform spectroscopy" technique. The main difference between a FTIR spectrometer and other dispersive-type spectrometers (or spectrometers based on tunable wide-free-spectral-range high-finesse Fabry-Perot filters) is that an FTIR spectrometer measures all the wavelengths coincidentally, while other types of spectrometers measure one wavelength a time. As a result, FTIR spectrometers have higher measuring speeds and larger signal to noise ratios than dispersive spectrometers.

FTIR spectrometers are typically based on Michelson interferometers, in which collimated light from a broadband source is split into two beams, which are then reflected off of respective mirrors (one of which is moving) and caused to interfere, allowing the temporal coherence of the light to be measured at each different Optical Path Difference (OPD) offered by the moving mirror. The resulting signal, called the interferogram, is measured by a detector at many discrete positions of the moving mirror. The measured spectrum is retrieved using a Fourier transform carried out by a processor.

The interferogram of a single wavelength coherent source is periodic and varies with the OPD by a cosine function. Ideally, measuring any part of the interferogram would result in the same spectrum. Broadband sources, however, have most of the interferogram power concentrated around the zero OPD. Therefore, the moving mirror travel range should cover this portion of the interferogram. This is usually achieved by letting the respective distances between the beam splitter and each of the mirrors be equal (or close to it) and moving the mirror such that the distance between the beam splitter and the moving mirror assumes both negative and positive values with respect to the OPD position resulting in the detection of a double-sided interferogram. The maximum travel range scanned by the moving mirror (i.e. actuator travel range) governs the resolving power of an FT spectrometer. The larger the travel range, the better the resolution such that the resolution is inversely proportional to the travel range.

Many versions of the FTIR spectrometer based on Michelson interferometry have been developed based on the motion of an in-plane mirror or out-of-plane mirror with respect to the substrate. FTIR spectrometers based on Fabry-Perot (FP) interferometers or Mach-Zehnder interferometers, instead of Michelson interferometers, have also been developed.

Micro-optical bench technology provides an excellent platform for highly-integrated, self-aligned and electromechanically scanned interferometers. It enables the design, validation, and fabrication of monolithic optical systems on a single silicon chip. The principal technology is based on Deep Reactive Ion Etching (DRIE) of silicon-on-insulator (SOI). The height of the micromirrors in the deeply-etched micro-optical benches is usually limited such that beyond this limit, the verticality of the etched surface deteriorates with a tilted profile and significantly rough surface. The optical throughput of the devices is directly related to the size and solid angle by which the device is accepting the optical energy from the source. At the same time, the signal-to-noise ratio of the sensor, such as an FTIR spectrometer device with micro-optical components, is directly related to its optical throughput of the components, if the rest of the system is optimized. This is especially true due to the low brightness of the wideband sources used in spectroscopy. Therefore, what is needed is a spectrometer device with an increased optical throughput.

SUMMARY OF THE INVENTION

Various aspects of the present disclosure provide a spectrometer with increased optical throughput and spectral resolution. The spectrometer includes a plurality of interferometers coupled in parallel and an optical splitter configured to divide a source light beam into a plurality of input beams and to direct each of the input beams to a respective one of the plurality of interferometers. One or more detectors are optically coupled to receive a respective output from each of the plurality of interferometers and is configured to detect an interferogram produced as a result of the outputs.

BRIEF DESCRIPTION OF THE DRAWINGS

A more complete understanding of the present disclosure may be obtained by reference to the following detailed description when taken in conjunction with the accompanying drawings wherein:

FIG. 1 is a schematic diagram illustrating exemplary components of a spectrometer including a plurality of parallel interferometers, in accordance with embodiments of the present disclosure;

FIG. 2 is a schematic diagram illustrating further exemplary components of a spectrometer including a plurality of parallel interferometers, in accordance with embodiments of the present disclosure;

FIGS. 15A and 15B illustrate exemplary interferograms of three individual interferometer spectrometers as compared with an interferogram of a parallel spectrometer;

FIGS. 17A and 17B illustrate exemplary interferograms of three individual interferometers scanning different optical path difference windows as compared with an interferogram of a parallel spectrometer scanning different optical path difference windows;

DETAILED DESCRIPTION OF THE DRAWINGS

Figure 3:
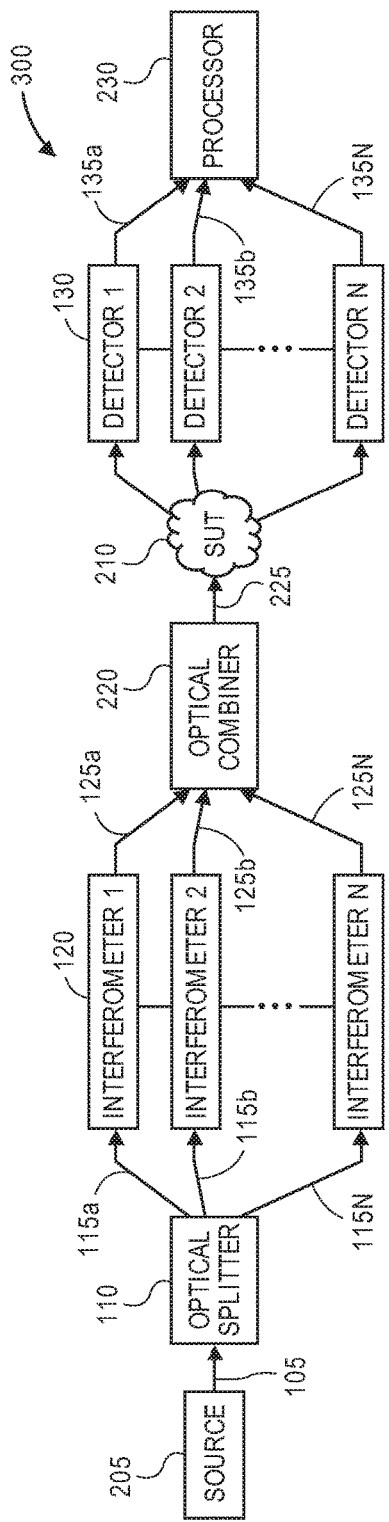
FIG. 3 is a schematic diagram illustrating further exemplary components of a spectrometer including a plurality of parallel interferometers, in accordance with embodiments of the present disclosure.

In accordance with embodiments of the present disclosure, a spectrometer is provided that overcomes the optical throughput limitations in narrow aperture size spectrometers by coupling the input power from the source to a plurality of interferometers coupled in parallel. The interferometers may be physically coupled in parallel such that at a given instance in time, the interferogram of each interferometer is correlated to and synchronized with the other interferograms. This correlation may be maintained mechanically and/or by optical design. For example, using deep etching fabrication technology, the optical/mechanical structures may be self-aligned, resulting in substantially accurate distances between components based on the lithographic process accuracy.

FIG. 1 is a block diagram illustrating exemplary components of a spectrometer 100, such as a Fourier Transform Infrared (FTIR) micro spectrometer, in accordance with embodiments of the present disclosure. The term "micro spectrometer" is used herein generally to refer to a small form-factor spectrometer capable of measuring the spectrum of microscopic samples or microscopic areas of larger samples. The spectrometer 100 includes an optical splitter 110, a plurality of interferometers 120 (Interferometer 1, Interferometer 2 . . . Interferometer N) coupled in parallel, and an optical detector 130. It should be understood that the interferometers 120 can be of any type, such as Michelson, Fabry-Perot (FP) or Mach-Zehnder (MZ). In addition, the plurality of interferometers 120 may include different types of interferometers. For example, one interferometer in the plurality of interferometers 120 may be a Michelson interferometer and another interferometer in the plurality of interferometers may be a Mach-Zehnder interferometer.

A wideband source spectrum (source light beam) 105 is received at the input of the optical splitter 110. The optical splitter 110 is configured to divide the source light beam 105 into a plurality of input beams 115a, 115b, . . . 115N and to direct each of the input beams to a respective one of the plurality of interferometers 120. For example, input beam 115a may be directed to Interferometer 1, input beam 115b may be directed to Interferometer 2, and input beam 115N may be directed to Interferometer N. Each interferometer 120 is optically coupled to receive the respective input beam and operable to direct the respective input beam along a respective optical path so as to produce a respective output (e.g., an interference pattern) 125a, 125b, . . . 125N. The optical detector 130 is optically coupled to receive the plurality of outputs 125a, 125b, . . . 125N from the interferometers 120 and to detect an interferogram 135 produced as a result of the plurality of outputs.

Each interferometer 120 includes at least one moveable element (such as a micromirror) coupled to an actuator (e.g., a Micro-Electro-Mechanical Systems (MEMS) actuator), which causes a displacement of the at least one moveable element to vary the optical path and create an optical path difference (OPD) between light beams propagating along the optical path. In an exemplary embodiment, the MEMS actuator may be an electrostatic actuator, such as a comb drive actuator, parallel plate actuator or other type of actuator. Since the resolution of an FTIR spectrometer is inversely proportional to the maximum optical path difference achieved, using interferometers 120 attached to MEMS actuators enables the production of a micro spectrometer 100 with high resolution performance, high signal-to-noise ratio, compact size and low cost.

In addition, each of the interferometers 120 may be made from air or silicon or both and can be physically coupled together such that at a given instance in time, the interferogram of each interferometer is correlated to and synchronized with the others. This correlation may be maintained mechanically and by the optical design of the spectrometer 100. For example, monolithic integration and lithographic alignment of the components within the micro spectrometer 100 can be achieved using, for example, a deep etching technique or a surface micromachining technique.

The respective optical path difference (OPD) introduced by each interferometer 120 modulates the output intensity at the detector 130. The modulated output intensity of each interferometer is the interferogram (interference signal/pattern), and is expressed as follows (discarding the DC component):

$$I(x) = \int_{-\infty}^{\infty} B(v)\cos(2\pi v x)dv \qquad \text{(Equation 1)}$$

where I is the output intensity, x is the optical path difference, v is the wavenumber (reciprocal of wavelength λ), and B is the spectrum of the input signal (the input beam to the interferometer). The detector 130 detects the interferograms of each of the interferometers 120 substantially simultaneously as a combined interferogram 135, such that the interferograms are superimposed on one another. The superposition of the individual interferometer interferograms effectively increases the optical throughput of the spectrometer 100.

For example, the throughput of each single interferometer 120 may be $D_s=A\Omega$, where A is the aperture area of the optical components and $\Omega$ is the acceptance angle subtended from the source. The parallel interferometer configuration improves the optical throughput N times, such that the new overall throughput of the parallel interferometer spectrometer is $D_p=A\Omega N$. Thus, by dividing the spectral energy of the source light beam 105 among the parallel interferometers 120 by the transverse extent of the aperture or its angular acceptance with respect to the source, the throughput of source power may be effectively increased.

FIG. 2 is a block diagram illustrating further exemplary components of a spectrometer 200, such as a Fourier Transform Infrared (FTIR) micro spectrometer, in accordance with embodiments of the present disclosure. The spectrometer 200 includes an optical source 205, an optical splitter 110, a plurality of interferometers 120 (Interferometer 1, Interferometer 2 . . . Interferometer N) coupled in parallel, an optical combiner 220, an optical detector 130 and a processor 230. The optical source 205 may be, for example, a laser source, a collimated LED, an optical fiber, or any other type of optical source that produces Infrared (IR) radiation. The interferometers 120 are physically and/or mechanically coupled in parallel, such that their interferograms can be added constructively at the detector 130.

A sample under test (SUT) 210 can be inserted anywhere in between the source 205 and the detector 130. In the example shown in FIG. 2, the SUT 210 is positioned between the source 205 and the optical splitter 110. The spectrometer 200 is configured to measure the spectrum of the SUT 210 using the plurality of parallel interferometers 120.

In an exemplary operation, the optical source 205 produces a wideband source spectrum (source light beam) 105 and directs the source light beam towards the SUT 210. Light scattered from (e.g., transmitted through and/or reflected by) the SUT 210 is received at the input of the optical splitter 110. The optical splitter 110 is configured to divide the source light beam (light scattered from the SUT 210) into a plurality of input beams 115a, 115b, . . . 115N and to direct each of the input beams to a respective one of the plurality of interferometers 120. For example, input beam 115a may be directed to Interferometer 1, input beam 115b may be directed to Interferometer 2, and input beam 115N may be directed to Interferometer N. Each interferometer 120 is optically coupled to receive the respective input beam and operable to direct the respective input beam along a respective optical path so as to produce a respective output (e.g., an interference pattern) 125a, 125b, . . . 125N. Each interferometer 120 includes at least one moveable element (such as a micromirror) coupled to an actuator (e.g., a Micro-Electro-Mechanical Systems (MEMS) actuator), which causes a displacement of the at least one moveable element to vary the optical path.

The outputs 125a, 125b, . . . 125N of the respective interferometers 120 are received by the optical combiner 220, which is configured to combine the outputs to produce a combined output 225 and to direct the combined output 225 towards the optical detector 130. The optical detector 130 is optically coupled to receive the combined output 225 and to detect a combined interferogram 135 produced as a result of the combined output. The processor 230 applies a Fourier Transform to the combined interferogram 135 to retrieve the measured spectrum.

The processor 230 may be a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor 230 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

FIG. 3 is a block diagram illustrating further exemplary components of a spectrometer 300, in accordance with embodiments of the present disclosure. The spectrometer 300 includes an optical source 205, an optical splitter 110, a plurality of interferometers 120 (Interferometer 1, Interferometer 2 . . . Interferometer N) coupled in parallel, an optical combiner 220, a plurality of optical detectors 130 (Detector 1, Detector 2, . . . Detector N) and a processor 230.

In the example shown in FIG. 3, the SUT 210 is positioned between the optical combiner 220 and the plurality of detectors 130. The spectrometer 300 is configured to measure the spectrum of the SUT 210 using the plurality of parallel interferometers 120.

In an exemplary operation, the optical source 205 produces a wideband source spectrum (source light beam) 105 and directs the source light beam towards the optical splitter 110. The optical splitter 110 is configured to divide the source light beam 105 into a plurality of input beams 115a, 115b, . . . 115N and to direct each of the input beams to a respective one of the plurality of interferometers 120. For example, input beam 115a may be directed to Interferometer 1, input beam 115b may be directed to Interferometer 2, and input beam 115N may be directed to Interferometer N. Each interferometer 120 is optically coupled to receive the respective input beam and operable to direct the respective input beam along a respective optical path so as to produce a respective output (e.g., an interference pattern) 125a, 125b, . . . 125N. Each interferometer 120 includes at least one moveable element (such as a micromirror) coupled to an actuator (e.g., a Micro-Electro-Mechanical Systems (MEMS) actuator), which causes a displacement of the at least one moveable element to vary the optical path.

The outputs 125a, 125b, . . . 125N of the respective interferometers 120 are received by the optical combiner 220, which is configured to combine the outputs to produce a combined output 225 and to direct the combined output towards the SUT 210. The resulting scattered light (e.g., light transmitted through or reflected from the SUT 210) is directed towards the array of detectors 130. The respective interferogram signals 135a, 135b, . . . 135N produced by each of the detectors 130 are then combined together in the processor 230 either before or after applying the mathematical transform (Fourier Transform) to the interferogram(s).

Figure 4:
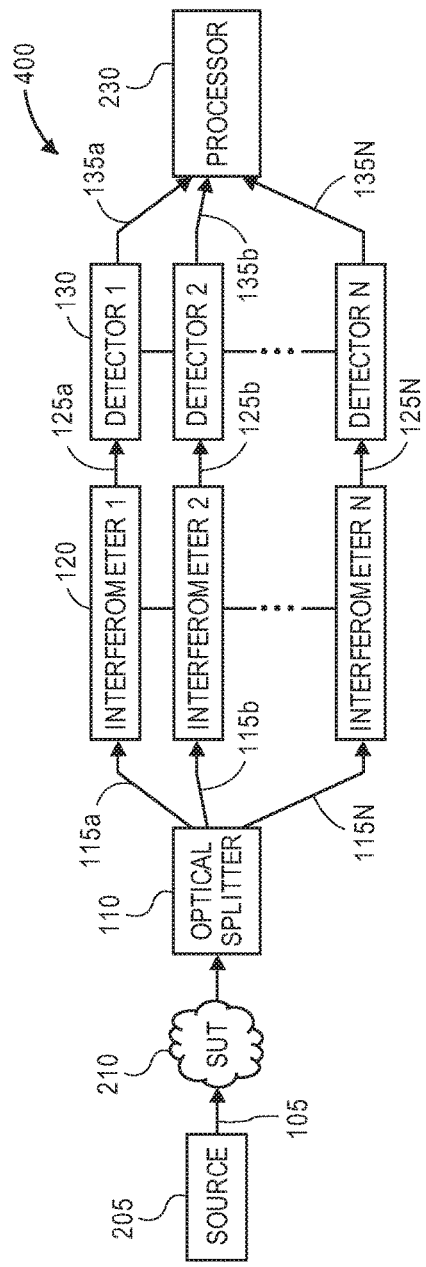
FIG. 4 is a schematic diagram illustrating further exemplary components of a spectrometer including a plurality of parallel interferometers, in accordance with embodiments of the present disclosure.

FIG. 4 is a block diagram illustrating further exemplary components of a spectrometer 400, in accordance with embodiments of the present disclosure. The spectrometer 400 includes an optical source 205, an optical splitter 110, a plurality of interferometers 120 (Interferometer 1, Interferometer 2 . . . Interferometer N) coupled in parallel, a plurality of optical detectors 130 (Detector 1, Detector 2, . . . Detector N) and a processor 230.

In the example shown in FIG. 4, the SUT 210 is positioned between the optical source 205 and the optical splitter 110. The spectrometer 400 is configured to measure the spectrum of the SUT 210 using the plurality of parallel interferometers 120.

In an exemplary operation, the optical source 205 produces a wideband source spectrum (source light beam) 105 and directs the source light beam towards the SUT 210. Light scattered from (e.g., transmitted through and/or reflected by) the SUT 210 is received at the input of the optical splitter 110. The optical splitter 110 is configured to divide the source light beam (light scattered from the SUT 210) into a plurality of input beams 115a, 115b, . . . 115N and to direct each of the input beams to a respective one of the plurality of interferometers 120. Each interferometer 120 is optically coupled to receive the respective input beam and operable to direct the respective input beam along a respective optical path so as to produce a respective output (e.g., an interference pattern) 125a, 125b, . . . 125N. Each interferometer 120 includes at least one moveable element (such as a micromirror) coupled to an actuator (e.g., a Micro-Electro-Mechanical Systems (MEMS) actuator), which causes a displacement of the at least one moveable element to vary the optical path.

Each interferometer output 125a, 125b, . . . 125N is directed towards a respective detector 130 in the array of detectors. For example, the output 125a from Interferometer 1 is directed towards Detector 1, the output 125b from Interferometer 2 is directed towards Detector 2, and so on. The respective interferogram signals 135a, 135b, . . . 135N produced by each of the detectors 130 are then combined together in the processor 230 either before or after applying the mathematical transform (Fourier transform) to the interferograms.

The interferograms 135a, 135b, . . . 135N generated by the detector array 130 may further be aligned and synchronized by the processor 230. In an exemplary embodiment, the optical path difference of each interferometer 120 can be precisely identified using a capacitive sensing technique that exploits the relation between capacitance change of MEMS comb drive actuators and the displacement thereof. In particular, capacitive sensing of the capacitance change of comb-drive actuators corresponds to the displacement of the actuators, and consequently the optical path difference (OPD). After the equalization of the delay between the interferograms, the overall interferogram can be obtained as the sum of the different interferograms with an effective higher optical throughput. In some embodiments, the summation may be performed after the Fourier Transform is applied to each interferogram, such that the superposition is carried out in the spectral domain. The peak location in the interferogram can be used to indicate the location of the zero OPD.

Figure 5:
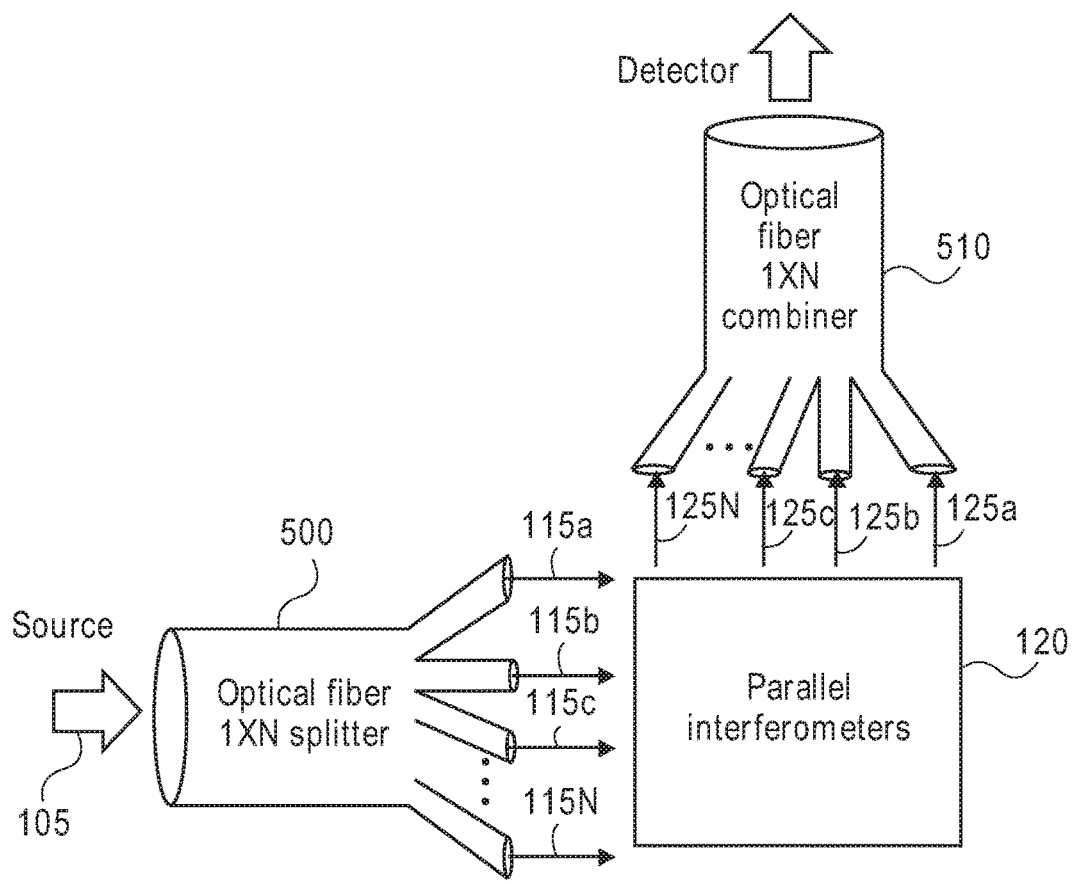
FIG. 5 is a schematic diagram illustrating an exemplary optical fiber splitter and optical fiber combiner for use in the spectrometer of the present disclosure.

The optical splitter 110 and optical combiner 220 shown in FIGS. 1-4 can be implemented, for example, using optical fiber technology, as shown in FIG. 5. The use of optical fiber technology allows the integration of the fiber into deeply-etched micro-optical benches by inserting the input/output fibers into micromachined grooves self-aligned with the parallel interferometers 120 on the chip.

FIG. 5 illustrates an optical fiber 1×N splitter 500 configured to divide the source light beam 105 throughput onto the parallel interferometers 120 by directing respective divided input beams 115a, 115b, 115c, . . . 115N towards respective interferometers 120. An optical fiber N×1 combiner 510 is configured to combine the respective outputs 125a, 125b, 125c, . . . 125N of the interferometers 120 onto a single detector. The optical fiber splitter 500 and optical fiber combiner 510 may each be fiber bundles that include multiple fibers. For the optical fiber splitter 500, the multiple fibers may be distributed on the transverse space or the angular space to maximize the throughput of the fiber bundle and match it, in terms of area and solid angle, to the source.

Figure 6:
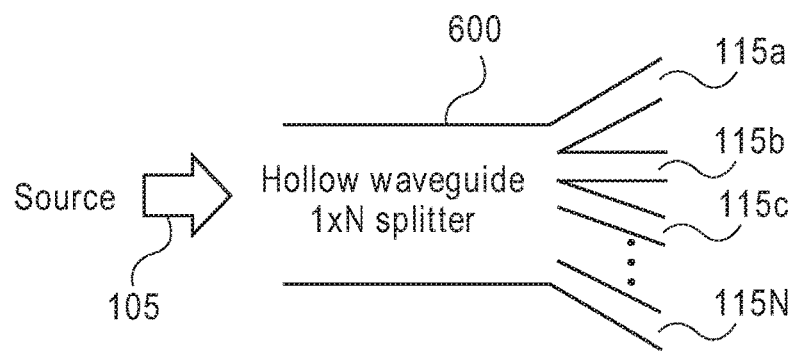
FIG. 6 is a schematic diagram illustrating an exemplary hollow waveguide optical splitter for use in the spectrometer of the present disclosure.
Figure 7A:
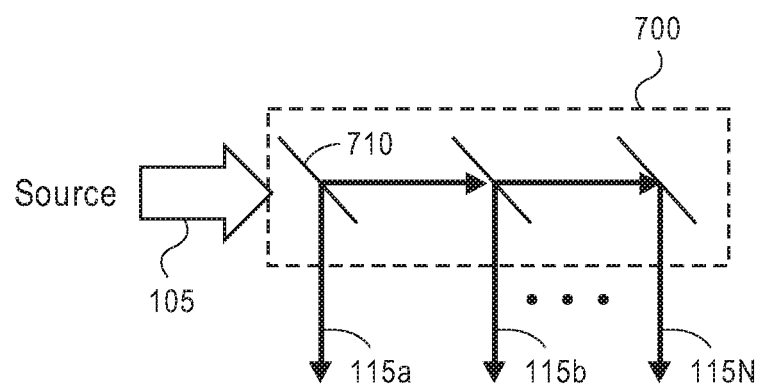
FIGS. 7A and 7B are schematic diagrams illustrating exemplary free-space optical splitters for use in the spectrometer of the present disclosure.
Figure 7B:
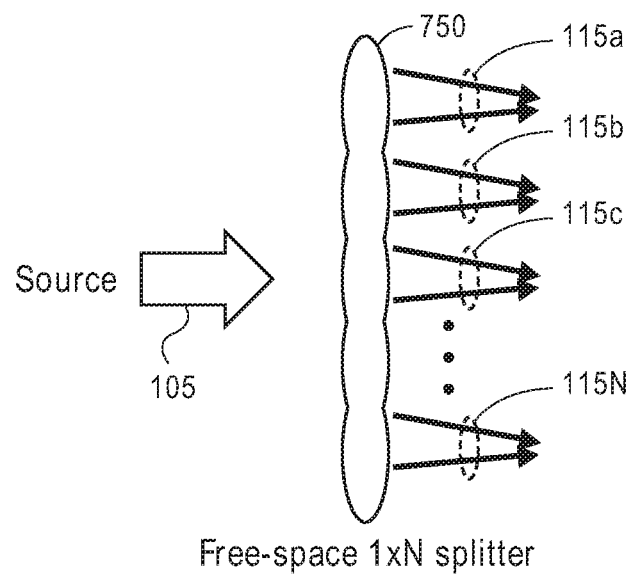

Referring now to FIGS. 6, 7A and 7B, the optical splitter 110 and optical combiner 220 shown in FIGS. 1-4 can also be implemented using hollow-waveguide technology or free-space technology. As shown in FIG. 6, a hollow waveguide 1×N splitter 600 may be used to divide the source light beam into a plurality of input beams 115a, 115b, 115c, . . . 115N. In an exemplary embodiment, the hollow waveguide splitter 600 is a multi-mode interference (MMI) air waveguide surrounded by silicon, so that the source light beam 105 propagates through one medium (air) without propagation through silicon, which causes guidance of the beam and consequently splitting thereof. For example, the air waveguide 600 can be fabricated by selective etching of a silicon-on-insulator (SOI) wafer using any type of isotropic and/or anisotropic etching technique, such as Deep Reactive Ion Etching (DRIE).

Outputs from the interferometers could also be combined using a similar hollow waveguide N×1 combiner (not shown). Waveguide technology is compatible with integrated optics system, where the interferometers and the input/output splitter/combiner are monolithically fabricated using planar technology. The use of hollow waveguides enables the monolithic integration of the waveguide with deeply etched micro-optical benches on semiconductor substrates, such as silicon.

As shown in FIG. 7A, a free-space optical splitter 710 including a plurality of beam splitters 710 may also be used to divide the source light beam 105 into the plurality of input beams 115a, 115b, . . . 115N. Each of the beam splitters 710 may be, for example, silicon/air interface beam splitters configured to split the incident source light beam 105 into two beams, one propagating in air towards the respective interferometer as an input beam (e.g., input beam 115a), and the other propagating in silicon towards the adjacent beam splitter 710.

As shown in FIG. 7B, other types of free-space 1×N splitters 750 may be used to divide the source light beam 105 into the plurality of input beams 115a, 115b, 115c, . . . 115N. Examples of other free-space optical splitters include, but are not limited to, truncating splitters, slotted splitters and Y-splitters. Outputs from the interferometers could also be combined using similar free-space N×1 combiners. Examples of free-space optical combiners include, but are not limited to, parabolic-reflector combiners, slotted combiners and Y combiners. Free-space technology is compatible with optical MEMS technology, where the refractive or diffractive component used for splitting/combining can be integrated on-chip or off-chip.

Figure 8:
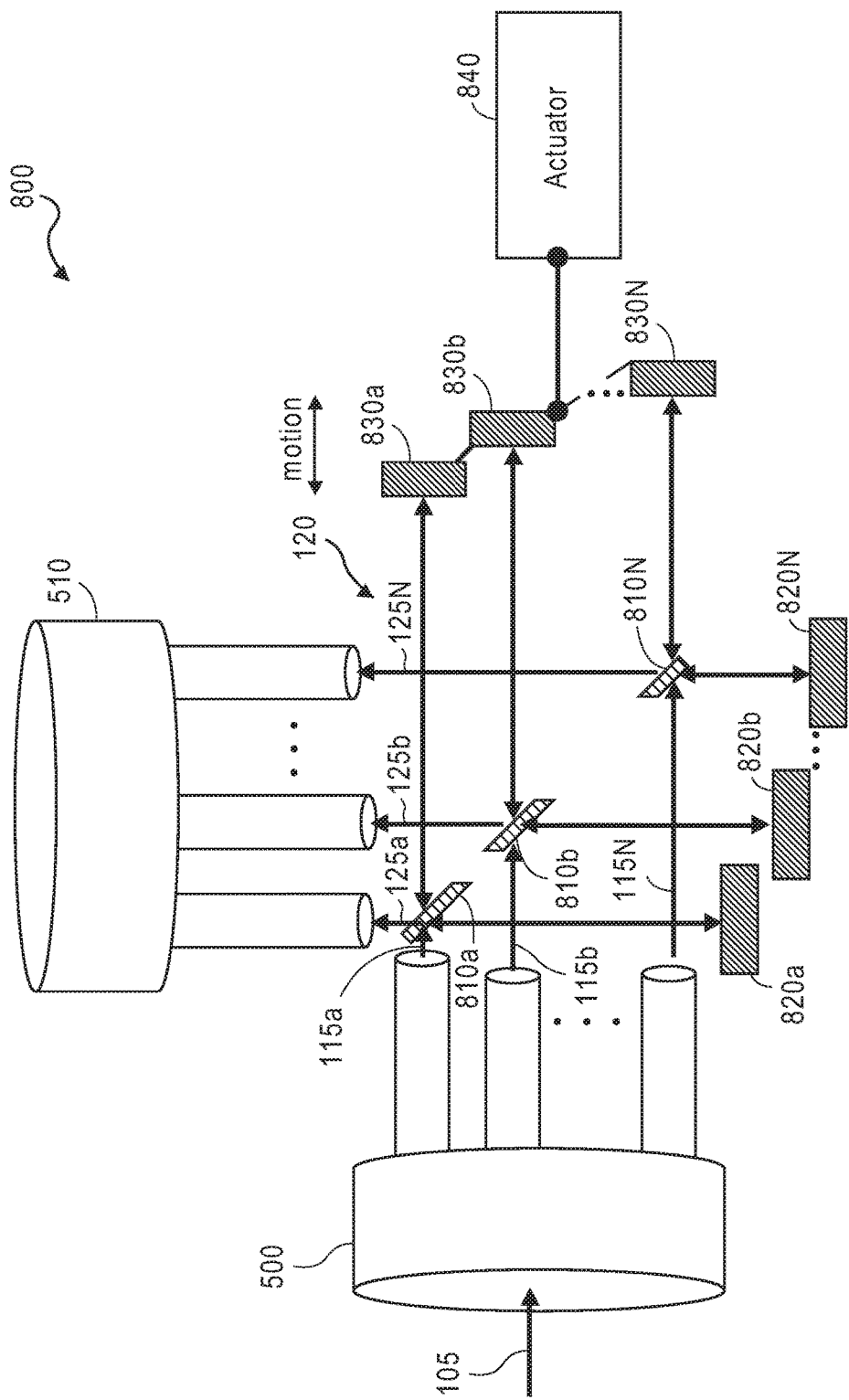
FIG. 8 is a schematic diagram illustrating an exemplary spectrometer including a plurality of parallel Michelson interferometers, in accordance with embodiments of the present disclosure.

As indicated above, each of the parallel interferometers shown in FIGS. 1-4 may be, for example, a Michelson interferometer, a Fabry-Perot interferometer or a Mach-Zehnder interferometer. FIG. 8 illustrates an exemplary spectrometer 800 including a plurality of parallel Michelson interferometers having a plurality of metallized moving mirrors 830a, 830b, . . . 830N coupled in parallel. A single actuator 840, such as a MEMS actuator, is coupled to the moving mirrors 830a, 830b, . . . 830N and configured to simultaneously cause a substantially identical displacement of each of the mirrors 830a, 830b, . . . 830N. Each of the moving mirrors 830a, 830b, 830N has a flat reflecting surface.

Each of the interferometers 120 includes a different beam splitter 810a, 810b, . . . 810N and a different metallized fixed mirror 820a, 820b, . . . 820N. Thus, a first interferometer 120 includes beam splitter 810a, fixed mirror 820a and moving mirror 830a. A second interferometer 120 includes beam splitter 810b, fixed mirror 820b and moving mirror 830b. Similarly, the Nth interferometer 120 includes beam splitter 810N, fixed mirror 820N and moving mirror 830N.

In an exemplary operation, the input beams 115a, 115b, . . . 115N from the source can be supplied using any of the optical splitters mentioned previously. For example, as shown in FIG. 8, an optical fiber splitter 500 may be used to divide the source light beam 105 into the plurality of input beams 115a, 115b, . . . 115N and to direct the input beams 115a, 115b, . . . 115N towards the respective interferometers. For example, the optical fiber splitter 500 can direct input beam 115a towards the beam splitter 810a of the first interferometer, input beam 115b towards the beam splitter 810b of the second interferometer and input beam 115N towards the beam splitter 810N of the Nth interferometer.

Each beam splitter 810a, 810b, . . . 810N may be, for example, a silicon/air interface beam splitter positioned at an angle (i.e., 45 degrees) from the respective input beam 115a, 115b, . . . 115N. The input beam is thus split into two beams, one propagating in air towards the respective fixed mirror 820a, 820b, . . . 820N and the other propagating in silicon towards the respective moving mirror 830a, 830b, 830N. For each of the interferometers, the beam propagating in air originates from the partial reflection of the input beam from the silicon/air half plane beam splitter, and thus has a reflection angle equal to the beam incidence angle. This beam propagates in air until reflected from the respective fixed mirror 820a, 820b, . . . 820N, thus producing a first reflected beam.

In addition, for each of the interferometers, the beam propagating in silicon originates from the partial transmission of the input beam through the silicon/air half plane beam splitter and propagates in silicon at an angle determined by Snell's law. This beam passes through the silicon and continues propagating until reflected by the respective moving mirror 830a, 830b, . . . 830N, thus producing a second reflected beam. The two reflected beams in each interferometer propagate back towards their respective beam splitters 810a, 810b, . . . 810N and interfere, thus producing respective interference patterns as respective output signals 125a, 125b, . . . 125N that can be combined via the N×1 optical fiber combiner 510 and detected by a detector (not shown).

By coupling the moving mirrors 830a, 830b, . . . 830N together and actuating the moving mirrors using a single actuator 840, the motion modulates the optical path difference of the parallel interferometers substantially simultaneously. Thus, the coupling of the moving mirrors 830a, 830b, . . . 830N represents the physical, mechanical and optical coupling between the parallel interferometers 120. In an exemplary embodiment, the moveable mirrors 830a, 830b, . . . 830N are collectively movable using a silicon-on-insulator (SOI) MEMS electrostatic comb drive actuator 840, thus allowing for an optical path length difference equal to double the mirror displacement. MEMS actuators are compatible with micro-optical bench technology, and MEMS electrostatic comb-drive actuators provide long enough motion needed to achieve the required maximum optical path difference.

In addition, as described above, the optical throughput of the parallel spectrometer shown in FIG. 8 is N times the optical throughput of a single interferometer spectrometer, if the optical path differences of the interferometers are adjusted such that they are equal. Coupling the moveable mirrors 830a, 830b, . . . 830N together ensures that the same modulation in the optical path difference is applied to all of the interferometers 120 at the same time. Thus, adjustment is achieved by precisely controlling the distance between the beam splitters and the respective fixed/moving mirrors for each interferometer. The precise control can be achieved, for example, using photolithography and deep etching techniques.

Figure 9:
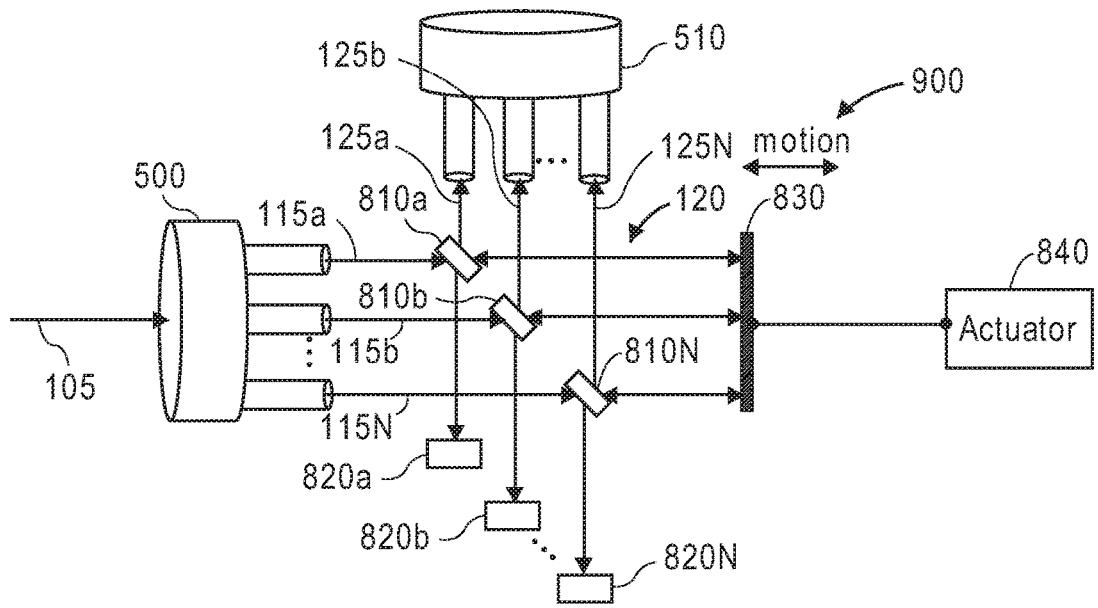
FIG. 9 is a schematic diagram illustrating another exemplary spectrometer including a plurality of parallel Michelson interferometers, in accordance with embodiments of the present disclosure.

FIG. 9 illustrates another exemplary spectrometer 900 including a plurality of parallel Michelson interferometers with a single moving mass 830 having a mirrored (i.e., metallized) flat surface shared between the interferometers 120. In addition, as in FIG. 8, a single actuator 840, such as a MEMS actuator, is coupled to the moving mass 830 and configured to cause a displacement of the moving mass 830. As also in FIG. 8, each of the interferometers 120 includes a different beam splitter 810a, 810b, . . . 810N and a different fixed mirror 820a, 820b, . . . 820N. Thus, a first interferometer 120 includes beam splitter 810a, fixed mirror 820a and moving mass 830. A second interferometer 120 includes beam splitter 810b, fixed mirror 820b and moving mass 830. Similarly, the Nth interferometer 120 includes beam splitter 810N, fixed mirror 820N and moving mass 830.

In an exemplary operation, the input beams 115a, 115b, . . . 115N from the source can be supplied using any of the optical splitters mentioned previously. For example, as shown in FIG. 9, an optical fiber splitter 500 may be used to divide the source light beam 105 into the plurality of input beams 115a, 115b, . . . 115N and to direct the input beams 115a, 115b, . . . 115N towards the respective interferometers. For example, the optical fiber splitter 500 can direct input beam 115a towards the beam splitter 810a of the first interferometer, input beam 115b towards the beam splitter 810b of the second interferometer and input beam 115N towards the beam splitter 810N of the Nth interferometer.

Each beam splitter 810a, 810b, . . . 810N may be, for example, a silicon/air interface beam splitter positioned at an angle (i.e., 45 degrees) from the respective input beam 115a, 115b, . . . 115N. The input beam is thus split into two beams, one propagating in air towards the respective fixed mirror 820a, 820b, . . . 820N and the other propagating in silicon towards the moving mass 830. The reflected beams from the moving mass 830 and respective fixed mirrors 820a, 820b, . . . 820N in each interferometer propagate back towards their respective beam splitters 810a, 810b, . . . 810N and interfere, thus producing respective interference patterns as respective output signals 125a, 125b, . . . 125N that can be combined via the N×1 optical fiber combiner 510 and detected by a detector (not shown).

The single shared moving mass 830 represents the physical, mechanical and optical coupling between the parallel interferometers 120. Having the moving mass 830 shared between the interferometers ensures that the same modulation in the optical path difference is applied to all the interferometers 120 at the same time.

Figure 10:
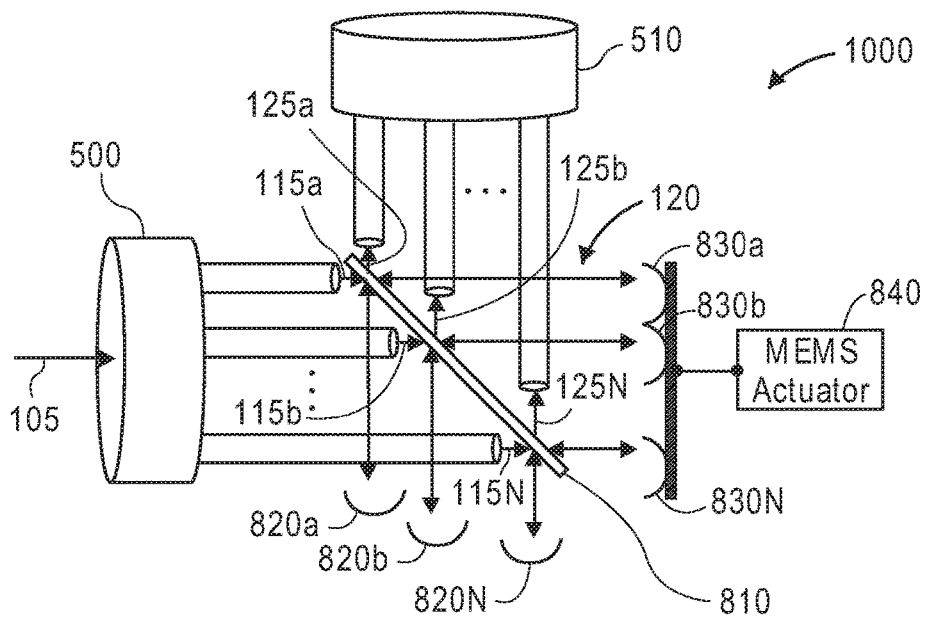
FIG. 10 a schematic diagram illustrating another exemplary spectrometer including a plurality of parallel Michelson interferometers, in accordance with embodiments of the present disclosure.

FIG. 10 illustrates another exemplary spectrometer 1000 including a plurality of parallel Michelson interferometers having a plurality of moving mirrors 830a, 830b, ... 830N coupled in parallel. The moving mirrors 830a, 830b, ... 830N may be curved surfaces, as shown in FIG. 10, and mechanically coupled together to form a common moving mass composed of an array of curved mirrors. The curved surfaces transform the light phase front in the moving arm path. The fixed mirrors 820a, 820b, ... 820N may also be curved surfaces to transform the light phase front in the fixed arm path. In some examples, the curvatures may be designed to maximize the output/input coupling efficiency at the zero optical path difference of each interferometer of the parallel set. For non-zero optical path difference, the coupling efficiency may be degraded with an effect equivalent to apodization in the interferogram.

When using optical fiber splitters/combiners 500/510, the fibers can be used as fiber rod lenses to transform the light phase front in the out-of-plane direction. In addition, when incorporating the spectrometer 1000 into a micro-optical bench, the fiber diameters can be optimized to match the size of the optical components. In one example, the diameter may be almost equal to the device layer height in SOI deeply-etched substrates. Furthermore, the optical axis of the light beams and the fiber central axes may be parallel to the substrate plane. For example, the fibers may be inserted into micromachined grooves self-aligned with the optical/mechanical structures.

Figure 11:
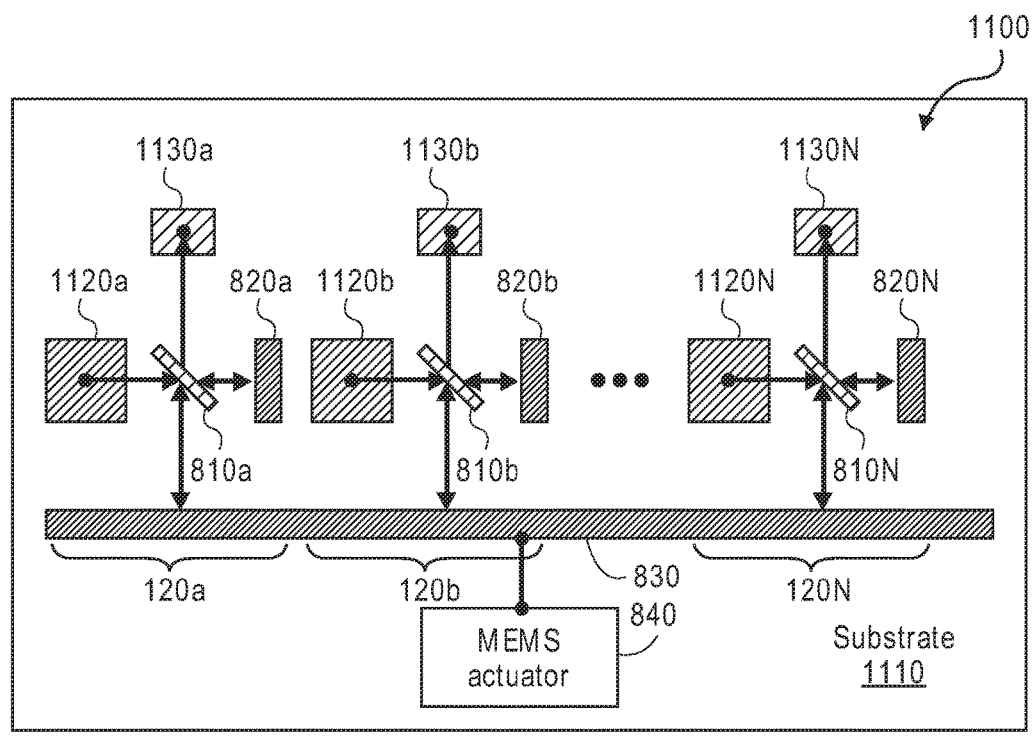
FIG. 11 a top view of a micro-optical bench including a parallel spectrometer device, in accordance with embodiments of the present disclosure.
Figure 12:
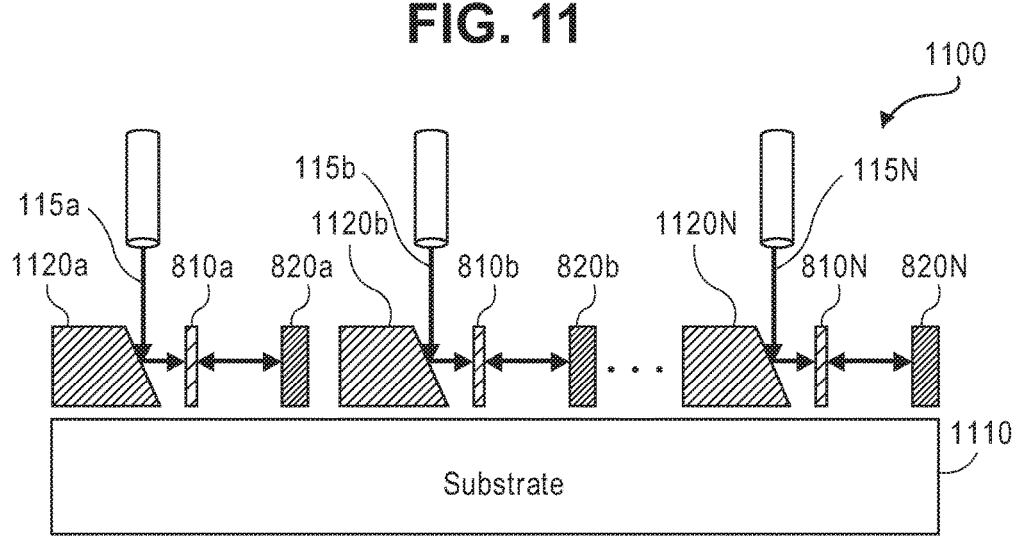
FIG. 12 is a side view of the micro-optical bench of FIG. 11.

The parallel interferometer array size can be increased with the embodiment shown in FIGS. 11 and 12. FIG. 11 a top view of a micro-optical bench 1100 including a parallel spectrometer device fabricated on a substrate 1110, such as silicon-on-insulator (SOI) wafer or another type of wafer (e.g., plastic, glass, etc.). FIG. 12 is a side view of the micro-optical bench 1100 of FIG. 11. The micro-optical bench 1100 includes a plurality of interferometers 120a, 120b, ... 120N coupled in parallel via a moving mass 830 having a mirrored (i.e., metallized) surface. In addition, a single actuator 840, such as a MEMS actuator, is coupled to the moving mass 830 and configured to cause a displacement of the moving mass 830.

Each of the interferometers 120 includes a different beam splitter 810a, 810b, ... 810N and a different fixed mirror 820a, 820b, ... 820N. Thus, a first interferometer 120a includes beam splitter 810a, fixed mirror 820a and moving mass 830. A second interferometer 120b includes beam splitter 810b, fixed mirror 820b and moving mass 830. Similarly, the Nth interferometer 120N includes beam splitter 810N, fixed mirror 820N and moving mass 830.

The input beams 115a, 115b, ... 115N coming from the source and the optical splitter are propagating from top to bottom with respect to the substrate 1110. This is indicated by the circular dots (spots) shown in the top view of FIG. 11. In embodiments in which the input beams 115a, 115b, ... 115N are coming from optical fibers, the fiber axis is perpendicular to the substrate plane, as shown in the side view of FIG. 12. Thus, each of the interferometers 120a, 120b, ... 120N further includes a respective first titled surface (e.g., an inclined dielectric mirror) 1120a, 1120b, 1120N to redirect the input beams 115a, 115b, ... 115N to the in-plane direction and a respective second tilted surface (e.g., an inclined dielectric mirror) 1130a, 1130b, 1130N to redirect the outputs to a detector or detectors and/or a combiner (not shown) out-of-plane. However, the optical paths of the interferometers 120a, 120b, ... 120N are parallel to the plane of the substrate 1110 and lie within the substrate 1110.

In an exemplary operation, the input beams 115a, 115b, ... 115N are directed to respective first tilted surfaces 1120a, 1120b, ... 1120N to redirect the light to the in-plane direction and propagate inside the micro-optical bench 1100 towards respective beam splitters 810a, 810b, ... 810N. In some examples, the first tilted surfaces 1120a, 1120b, ... 1120N may be curved to transform the phase front of the light.

Each beam splitter 810a, 810b, ... 810N splits the respective input beam 115a, 115b, ... 115N into two beams, one propagating in air towards the respective fixed mirror 820a, 820b, ... 820N and the other propagating in silicon towards the moving mass 830. The reflected beams from the moving mass 830 and respective fixed mirrors 820a, 820b, ... 820N in each interferometer 120a, 120b, ... 120N propagate back towards their respective beam splitters 810a, 810b, ... 810N and interfere, thus producing respective interference patterns as respective output signals that are directed to the respective second tilted surfaces 1130a, 1130b, ... 1130N to redirect the outputs to the top in the out-of-plane direction. In some examples, the outputs can be combined using fiber or free-space components (not shown) before hitting a detector (not shown).

Figure 13:
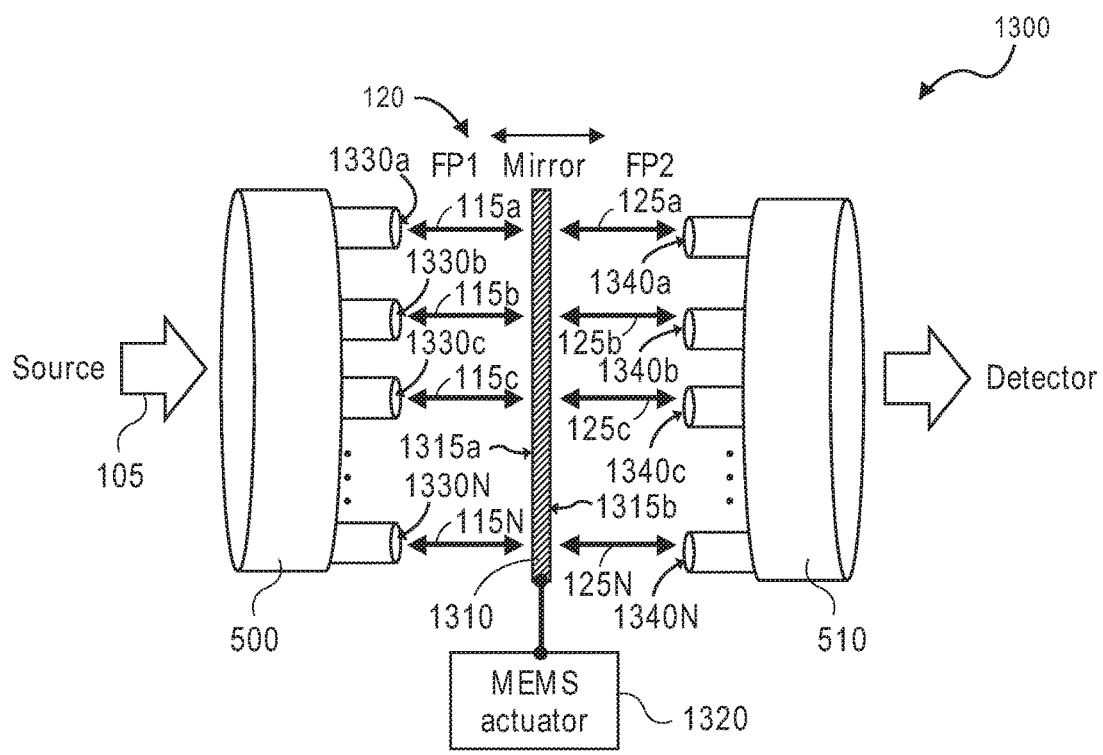
FIG. 13 is a schematic diagram illustrating an exemplary spectrometer including a plurality of parallel Fabry-Perot interferometers, in accordance with embodiments of the present disclosure.

FIG. 13 is a schematic diagram illustrating an exemplary spectrometer 1300 including a plurality of parallel Fabry-Perot (FP) interferometers 120, in accordance with embodiments of the present disclosure. The spectrometer 1300 includes a first set of FP interferometers FP1 and a second set of FP interferometers FP2. Each FP interferometer in the first set of interferometers FP1 has a corresponding FP interferometer in the second set of interferometers FP2, such that the combination of corresponding FP interferometers in the first and second sets FP1 and FP2 produce a single output. Physical, optical and mechanical coupling between the combined interferometers is achieved using a single moving mass 1310 shared between the combined interferometers. The moving mass 1310 may include, for example, a dielectric material (e.g., silicon) with parallel partially reflective surfaces 1315a and 1315b. The moving mass 1310 is coupled to a MEMS actuator 1320 to cause a displacement of the moving mass 1310.

Each Fabry-Perot interferometer (one of the FP1 interferometers or one of the FP2 interferometers) is formed between the fiber end face 1330a, 1330b, 1330c, ... 1330N or 1340a, 1340b, 1340c, ... 1340N and a respective surface 1315a or 1315b of the moving mass 1310. For example, within the first set of interferometers FP1, a first interferometer is formed between fiber end face 1330a and mirror surface 1315a, a second interferometer is formed between fiber end face 1330b and mirror surface 1315a, a third interferometer is formed between fiber end face 1330c and mirror surface 1315a, and an Nth interferometer is formed between fiber end face 1330N and mirror surface 1315a. Similarly, for the second set of interferometers FP2, a first interferometer is formed between fiber end face 1340a and mirror surface 1315b, a second interferometer is formed between fiber end face 1340b and mirror surface 1315b, a third interferometer is formed between fiber end face 1340c and mirror surface 1315b, and an Nth interferometer is formed between fiber end face 1340N and mirror surface 1315b. In one embodiment, all or some of the fiber ends may be coated with a dielectric or thin metallic material to improve its reflectivity to a given value. In another embodiment, one or more uncoated fiber ends may be used to produce a low finesse FP interferometer.

The first interferometer of FP1 and the first interferometer of FP2 are coupled in series in the optical path and collectively form a first combined interferometer. Likewise, the second interferometer of FP1 and the second interferometer of FP2 are coupled in series in the optical path and collectively form a second combined interferometer, and so on. The first combined interferometer is coupled in parallel to the other combined interferometers via the moving mass 1310. The motion of the mass 1310 modulates the optical path difference of the first set of interferometers FP1 and the second set of interferometers FP2 oppositely.

In an exemplary operation, each input beam 115a, 115b, 115, . . . 115N from the source light beam 105 and optical fiber splitter 500 enters a respective FP air cavity of the first set of interferometers FP1 and is reflected multiple times off of each of the reflecting surfaces (e.g., fiber end faces 1330a, 1330b, 1330c, . . . 1330N and mirror surface 1315a). Part of the reflected light is transmitted through the moving mirror mass 1310 each time the light reaches the mass 1310, and is input to the corresponding interferometer in the second set of interferometers FP2. The light is again reflected multiple times off of each of the reflecting surfaces (e.g., mirror surface 1315b and fiber end faces 1340a, 1340b, 1340c, . . . 1340N), and part of the reflected light is transmitted through fiber end faces 1340a, 1340b, 1340c, . . . 1340N each time resulting in multiple offset beams transmitted through fiber end faces 1340a, 1340b, 1340c, . . . 1340N that interfere with each other to produce respective interference patterns 125a, 125b, 125c, . . . 125N that can be combined by the combiner 510 and detected by the detector.

Figure 14:
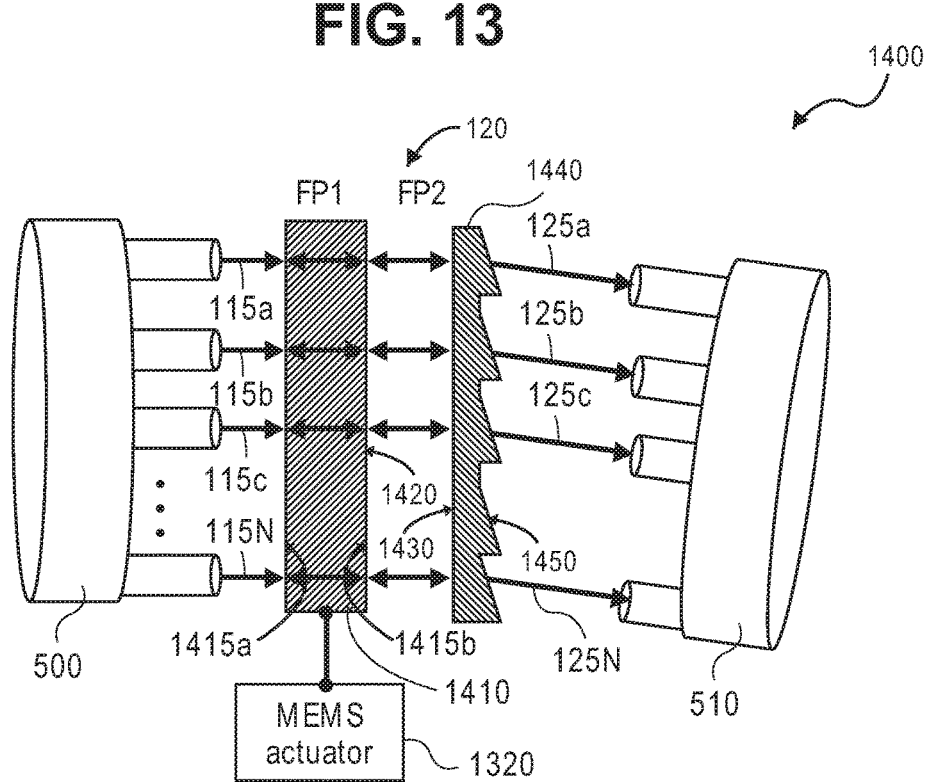
FIG. 14 is a schematic diagram illustrating another exemplary spectrometer including a plurality of parallel Fabry-Perot interferometers, in accordance with embodiments of the present disclosure.

FIG. 14 is a schematic diagram illustrating another exemplary spectrometer 1400 including a plurality of parallel Fabry-Perot interferometers, in accordance with embodiments of the present disclosure. The spectrometer 1400 includes a first set of FP interferometers FP1 and a second set of FP interferometers FP2. Each FP interferometer in the first set of interferometers FP1 has a corresponding FP interferometer in the second set of interferometers FP2, such that the combination of corresponding FP interferometers in the first and second sets FP1 and FP2 produce a single output. Physical, optical and mechanical coupling between the combined FP interferometers is achieved using a single moving mass 1410 (e.g., piece of dielectric material) shared between the combined interferometers. The moving mass 1410 is coupled to a MEMS actuator 1320 to cause a displacement of the moving mass 1410.

The first set of Fabry-Perot interferometers (FP1) is formed inside the moving mass 1410 between its parallel interior surfaces 1415a and 1415b. Thus, the optical path of the first set of interferometers FP1 is kept constant in operation, but can vary with the wavelength. The second set of Fabry-Perot interferometers (FP2) is formed between an outer surface 1420 of the shared moving mass 1410 and a parallel surface 1430 of an additional piece of dielectric material 1440. To avoid a parasitic third set of Fabry-Perot interferometers, the opposite exterior surface 1450 of the additional piece of dielectric material 1440 may be tilted with respect to the other surfaces. Thus, as can be seen in FIG. 14, the optical splitter 500 and optical combiner 510 may not share the same optical axis direction.

In an exemplary operation, each input beam 115a, 115b, 115, . . . 115N from the optical fiber splitter 500 enters a respective FP cavity of the first set of interferometers FP1 and is reflected multiple times off of each of the reflecting surfaces (e.g., parallel interior surfaces 1415a and 1415b of the moving mass 1410). Part of the reflected light is transmitted through the moving mass 1410 each time the light reaches the surface 1415b, and is input to the corresponding interferometer in the second set of interferometers FP2. The light is again reflected multiple times off of each of the reflecting surfaces (e.g., surface 1420 of moving mass 1410 and parallel surface 1430 of the additional dielectric material 1440) and part of the reflected light is transmitted through the additional dielectric material 1440 each time resulting in multiple offset beams that interfere with each other to produce respective interference patterns 125a, 125b, 125c, . . . 125N that can be combined by the combiner 510 and detected by the detector.

The embodiments shown in FIGS. 13 and 14 may be implemented, for example, using micro-optical bench technology, where the light is propagating in-plane with respect to the substrate, or using surface micromachining and planar technology, where the light is propagating out-of-plane with respect to the optical axis.

Referring now to FIGS. 15A and 15B, the output from a spectrometer with a single interferometer may be compared with the output from a parallel spectrometer. As shown in FIG. 15A, the individual outputs of three spectrometers, each having only a single interferometer are shown. In FIG. 15B, the output of a spectrometer having three parallel interferometers is shown. As can be seen from FIGS. 15A and 15B, the interferogram of the spectrometer having three parallel interferometers is approximately three times stronger than any of the interferograms of the individual interferometer spectrometers. It follows then that for N parallel interferometers, the interferogram of the parallel spectrometer would be approximately N times stronger than the interferogram of a single interferometer spectrometer. The interferogram is given for a wideband source with a wavelength range of 1000 nm to 2000 nm, as an example.

Figure 16:
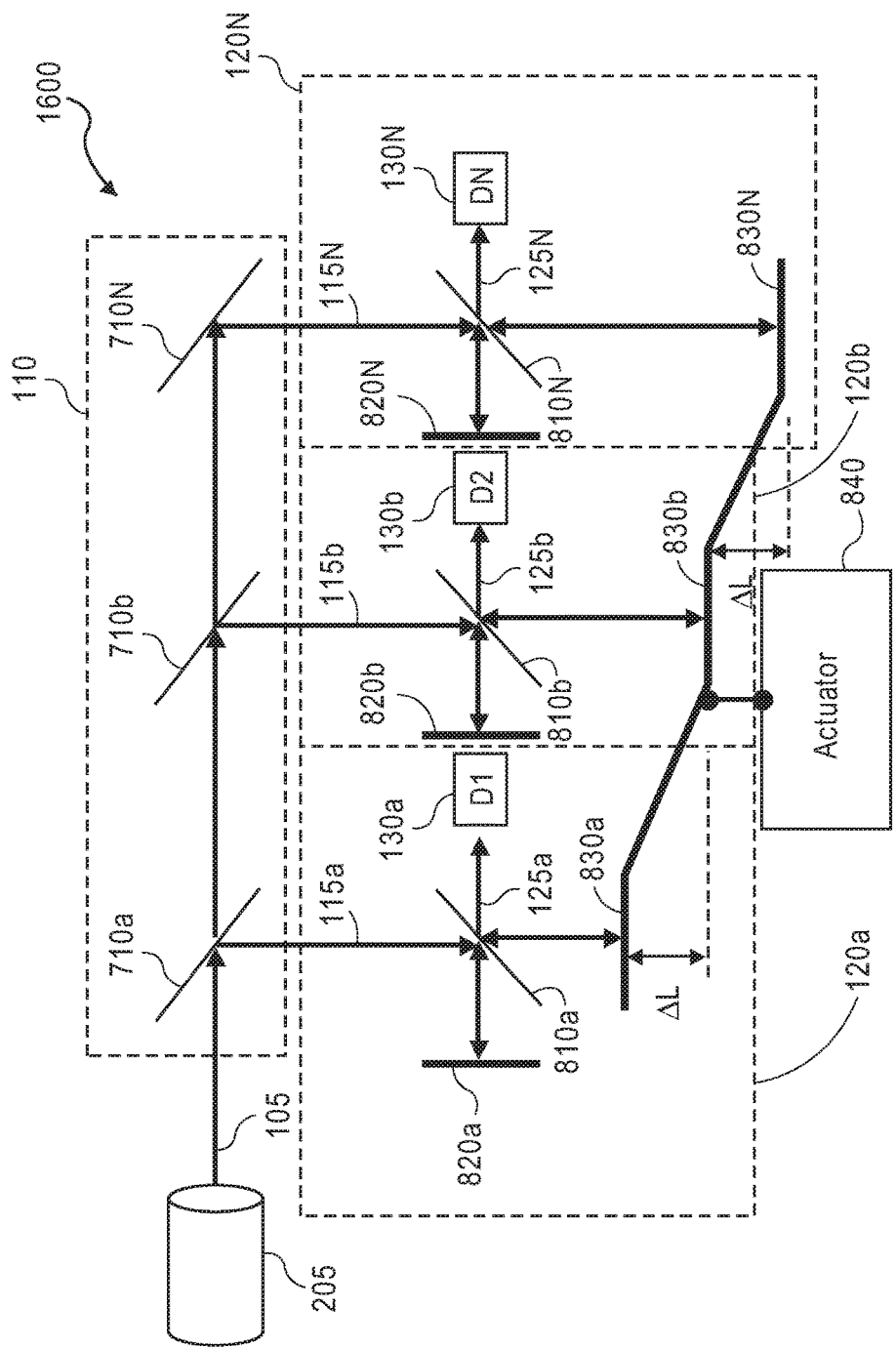
FIG. 16 is a schematic diagram illustrating an exemplary spectrometer including a plurality of parallel Michelson interferometers and a free-space optical splitter, in accordance with embodiments of the present disclosure.

FIG. 16 is a schematic diagram illustrating an exemplary spectrometer 1600 including a plurality of parallel Michelson interferometers and a free-space optical splitter, in accordance with embodiments of the present disclosure. The spectrometer 1600 includes a plurality of parallel Michelson interferometers 120a, 120b, . . . 120N, each having a respective metallized moving mirror 830a, 830b, . . . 830N coupled in parallel. A single actuator 840, such as a MEMS actuator, is coupled to the moving mirrors 830a, 830b, . . . 830N and configured to simultaneously cause a displacement of each of the mirrors 830a, 830b, . . . 830N.

Each of the interferometers 120a, 120b, . . . 120N includes a different beam splitter 810a, 810b, . . . 810N and a different metallized fixed mirror 820a, 820b, 820N. Thus, a first interferometer 120a includes beam splitter 810a, fixed mirror 820a and moving mirror 830a. A second interferometer 120b includes beam splitter 810b, fixed mirror 820b and moving mirror 830b. Similarly, the Nth interferometer 120N includes beam splitter 810N, fixed mirror 820N and moving mirror 830N.

In an exemplary operation, a source light beam 105 from the source 205 can be divided by a free-space optical splitter 110 into the plurality of input beams 115a, 115b, . . . 115N. For example, a plurality of beam splitters 710a, 710b, . . . 710N may be used to divide the source light beam 105 into the plurality of input beams 115a, 115b, . . . 115N and to direct the input beams 115a, 115b, . . . 115N towards the respective interferometers. For example, beam splitter 710a can direct input beam 115a towards the beam splitter 810a of the first interferometer, beam splitter 710b can direct input beam 115b towards the beam splitter 810b of the second interferometer and beam splitter 710N can direct input beam 115N towards the beam splitter 810N of the Nth interferometer.

Each interferometer beam splitter 810a, 810b, . . . 810N splits the respective input beam 115a, 115b, . . . 115N into two beams, one propagating in air towards the respective fixed mirror 820a, 820b, . . . 820N and the other propagating in silicon towards the respective moving mirror 830a, 830b, . . . 830N. The reflected beams from the moving mirrors 830a, 830b, . . . 830N and respective fixed mirrors 820a, 820b, . . . 820N in each interferometer 120a, 120b, . . . 120N propagate back towards their respective beam splitters 810a, 810b, . . . 810N and interfere, thus producing respective interference patterns as respective output signals 125a, 125b, . . . 125N that are directed to respective detectors 130a, 130b, . . . 130N.

The parallel spectrometer 1600 shown in FIG. 16 provides for enhanced resolution. Each of the parallel interferometers 120a, 120b, . . . 120N has an optical path difference that is shifted with respect to the adjacent interferometer by $\Delta L$. Thus, for a given actuator travel range $\Delta x$, the optical path difference of the first interferometer 120a is $2\Delta x$. The optical path difference of the second interferometer 120b is $2\Delta x+\Delta L$. The optical path difference of the Nth interferometer 120N is likewise $2\Delta x+(N-1)\Delta L$. If $2\Delta x_{max}=\Delta L$ and $2\Delta x_{min}=0$, then the concatenation of the interferograms of the parallel interferometers will form one long interferogram with a span of the optical path difference from zero to $2\Delta x_{max}+(N-1)\Delta L=N \Delta L$. Thus, the resolution of the parallel spectrometer is N times better than the resolution of single interferometer spectrometer.

The parallel interferometers may be scanning the same optical path difference windows, as shown in FIGS. 8-14, or different windows, as shown in FIG. 16. For the former case, the superposition of their interferograms will generate a combined interferogram with higher optical throughout and higher signal to noise ratio. For the latter case, the superposition of their interferograms will generate a combined interferogram with an optical path difference equal to the sum of the optical path differences of the individual interferometers. In this case, as shown in FIGS. 17A and 17B, the resolution of the parallel spectrometer (shown in FIG. 17B) will be N times better than the resolution of the individual interferometer spectrometry (shown in FIG. 17A) for a given actuator travel range and for N parallel interferometers: $\lambda\lambda_p=\Delta\lambda_s/N$ where $\Delta\lambda_p$ is the spectral resolution of the parallel spectrometer and $\Delta\lambda_s$ is the resolution of the single interferometer resolution.

Although the spectrometers shown in FIGS. 1-14 and 16 have been described as being implemented using free-space micro-optical bench technology, in other embodiments, integrated optics technology or silicon photonics technology may be used to implement the spectrometer. In addition, although the embodiments described above vary the optical path using a moveable actuator, in other embodiments, the optical path may be varied using thermo-optic and/or electro-optic effects.

Figure 18:
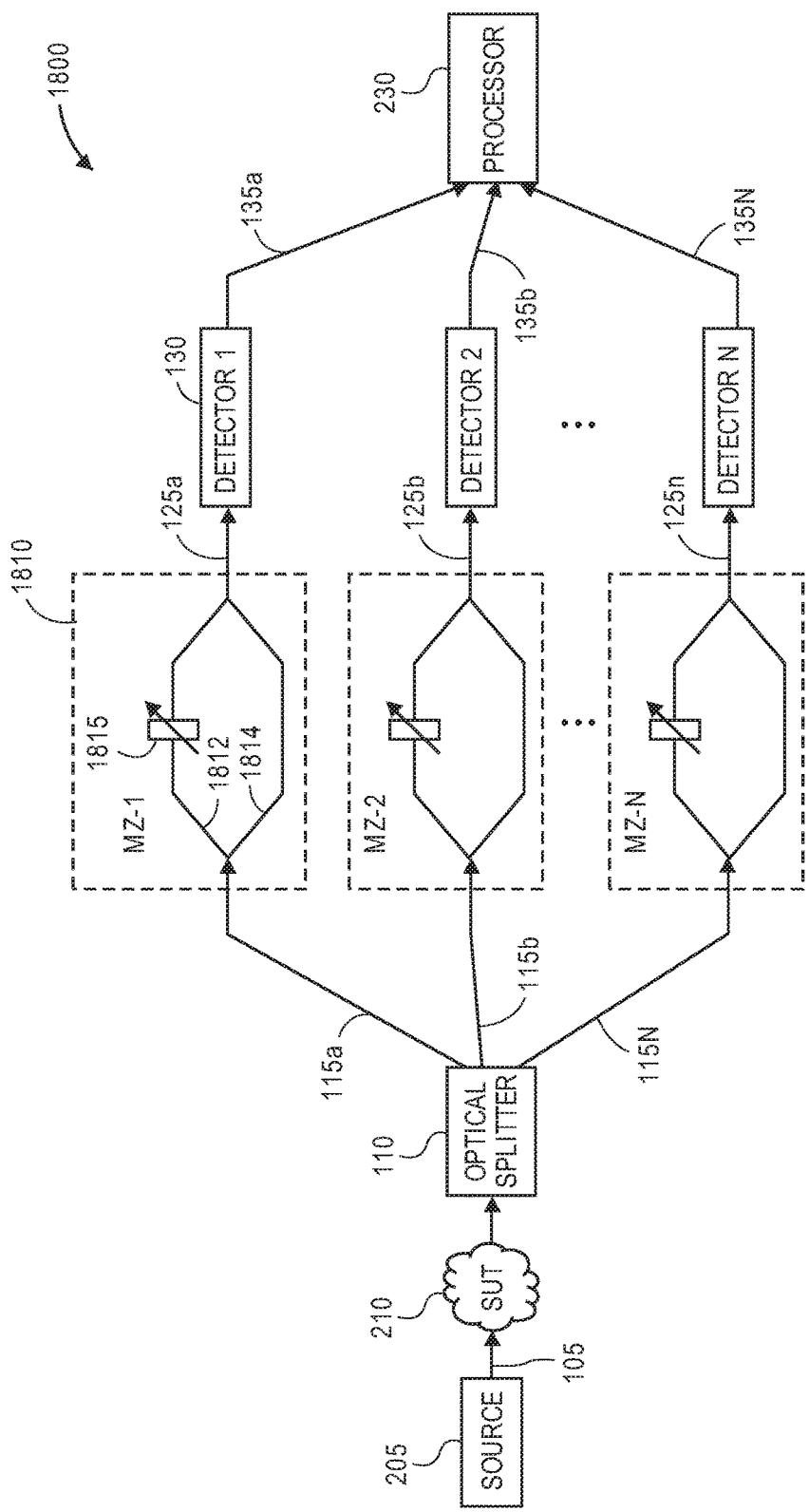
FIG. 18 is a schematic diagram illustrating an exemplary spectrometer including a plurality of parallel Mach-Zehnder interferometers, in accordance with embodiments of the present disclosure.

For example, with reference to FIG. 18, a spectrometer 1800 including a plurality of parallel Mach-Zehnder (M-Z) interferometers 1810 is shown. The spectrometer 1800 includes an optical source 205, an optical splitter 110, the plurality of M-Z interferometers 1810 (M-Z 1, M-Z 2 . . . M-Z N) coupled in parallel, a plurality of optical detectors 130 (Detector 1, Detector 2, . . . Detector N) and a processor 230.

In the example shown in FIG. 18, the SUT 210 is positioned between the optical source 205 and the optical splitter 110. The spectrometer 1800 is configured to measure the spectrum of the SUT 210 using the plurality of parallel M-Z interferometers 1810.

In an exemplary operation, the optical source 205 produces a wideband source spectrum (source light beam) 105 and directs the source light beam towards the SUT 210. Light scattered from (e.g., transmitted through and/or reflected by) the SUT 210 is received at the input of the optical splitter 110. The optical splitter 110 is configured to divide the source light beam (light scattered from the SUT 210) into a plurality of input beams 115a, 115b, . . . 115N and to direct each of the input beams to a respective one of the plurality of M-Z interferometers 1810.

Each M-Z interferometer 1810 includes two arms 1812 and 1814, and each M-Z interferometer 1810 is optically coupled to receive the respective input beam and operable to direct the respective input beam along each of the arms 1812 and 1814 so as to produce a respective output (e.g., an interference pattern) 125a, 125b, . . . 125N. The optical path length in one arm 1812 of each of the M-Z interferometers is modulated using an electro-optic or thermo-optic modulator 1815 to vary the OPD between the arms 1812 and 1814 of the interferometer 1810. Each output 125a, 125b, . . . 125N is directed towards a respective detector 130. For example, the output 125a from M-Z 1 is directed towards Detector 1, the output 125b from M-Z 2 is directed towards Detector 2, and so on.

In an exemplary embodiment, the OPD window in each of the M-Z interferometers 1810 is different. Therefore, the interferograms 135a, 135b, . . . 135N obtained by the respective detectors 130 can be concatenated together in the processor 230, either before or after applying the mathematical transform (Fourier transform) to the interferograms, to increase the resolution of the spectrometer by N times as compared to a spectrometer with a single M-Z interferometer. Electro-optic and/or thermo-optic modulators may also be used in Fabry-Perot and/or Michelson interferometers to vary the optical path.

Figure 19:
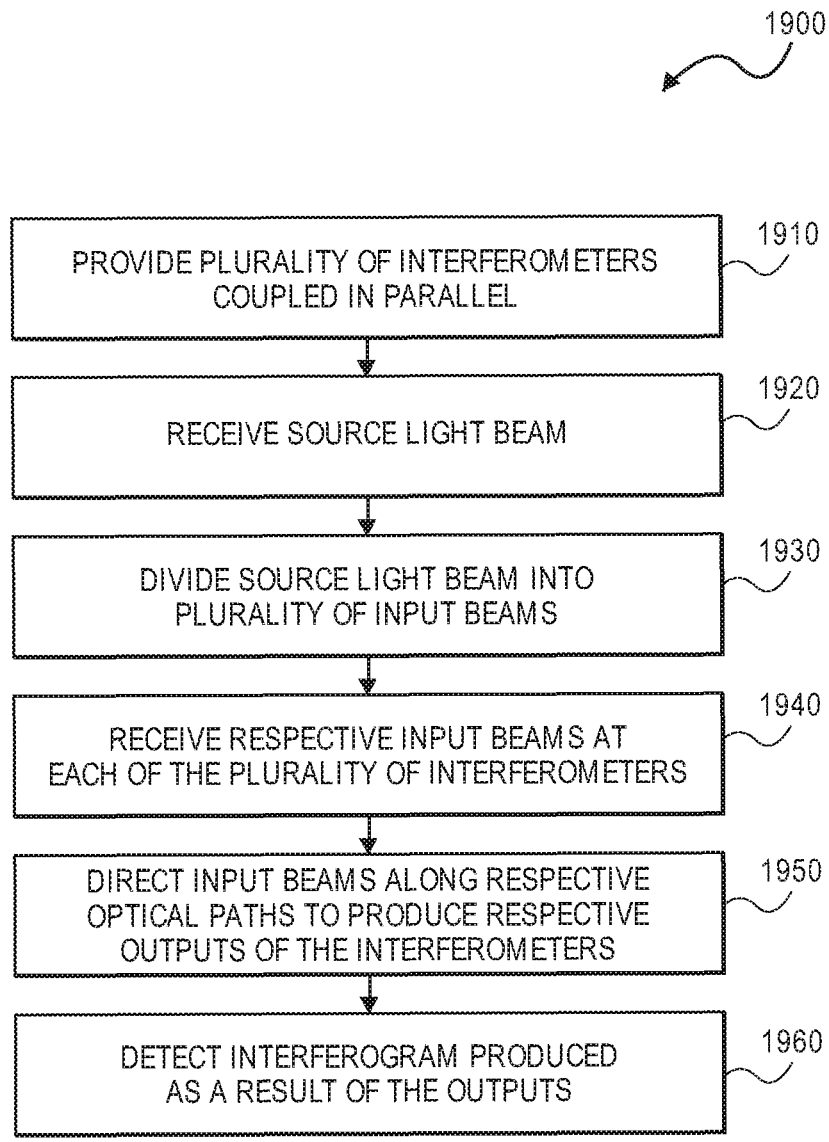
FIG. 19 is a flowchart illustrating an exemplary process for implementing a parallel spectrometer, in accordance with embodiments of the present disclosure.

FIG. 19 illustrates an exemplary method 1900 for implementing a parallel spectrometer, in accordance with embodiments of the present disclosure. The method 1900 shown in FIG. 19 may be implemented, for example, by any of the parallel spectrometer devices shown in FIG. 1-4, 8-14, 16 or 18. The method 1900 begins at block 1910 by providing a plurality of interferometers coupled in parallel. At block 1920, a source light beam is received by the spectrometer, and at block 1930, the source light beam is divided into a plurality of input beams. At block 1940, each of the input beams is received by a respective one of the plurality of interferometers, and at block 1950, the input beams are directed along respective optical paths of the parallel interferometers to produce respective outputs thereof. At block 1960, an interferogram produced as a result of the outputs of the parallel interferometers is detected at a detector.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A spectrometer, comprising:
  a single optical splitter optically coupled to receive a source light beam and configured to divide the source light beam into a plurality of input beams;
  a plurality of scanning interferometers that are synchronized with respect to their motion and mechanically and optically coupled in parallel, each of the plurality of interferometers optically coupled to the single optical splitter to receive a respective single one of the plurality of input beams and configured to direct the respective input beam along a respective optical path, each providing a same optical path difference, to simultaneously produce a respective one of a plurality of identical outputs; and a single pixel detector optically coupled to simultaneously receive the plurality of identical outputs and configured to produce an interferogram as a result of a summation of the plurality of identical outputs.

2. The spectrometer of claim 1, wherein the optical splitter includes at least one of a multi-mode interference hollow waveguide or a free-space optical component.

3. The spectrometer of claim 1, further comprising:
an optical combiner optically coupled to receive the plurality of outputs and configured to combine the plurality of outputs to produce a combined output.

4. The spectrometer of claim 3, wherein the optical combiner is further configured to direct the combined output to a sample under test positioned between the optical combiner and the detector.

5. The spectrometer of claim 4, wherein the optical combiner includes at least one of an optical fiber combiner, a waveguide, a multi-mode interference hollow waveguide, or a free-space optical component.

6. The spectrometer of claim 1, further comprising:
a source for producing the source light beam and configured to direct the source light beam to a sample under test positioned between the source and the optical splitter.

7. The spectrometer of claim 1, further comprising:
a substrate, the plurality of interferometers formed in a surface of the substrate.

8. The spectrometer of 7, wherein the plurality of interferometers includes a moving mirror shared between the plurality of interferometers, and further comprising:
an actuator coupled to the moving mirror for causing a displacement thereof that varies the respective optical path of each of the plurality of interferometers.

9. The spectrometer of claim 8, wherein the actuator is configured to displace the moving mirror to simultaneously vary the respective optical path of each of the plurality of interferometers.

10. The spectrometer of claim 9, wherein the moving mirror includes an array of flat surfaces.

11. The spectrometer of claim 8, wherein the actuator is a Micro-Electro-Mechanical System (MEMS) actuator.

12. The spectrometer of claim 8, wherein the plurality of interferometers are Michelson interferometers and each of the Michelson interferometers includes a respective beam splitter and a respective fixed mirror.

13. The spectrometer of claim 12, wherein the moving mirror includes an array of curved surfaces coupled together and each respective fixed mirror includes a respective curved surface.

14. The spectrometer of claim 12, wherein:
the optical splitter is configured to direct the respective input beams towards the respective interferometers by causing the respective input beams to propagate perpendicular to a plane of the substrate and perpendicular to an optical axis of the spectrometer; and
each of the plurality of interferometers further includes a respective angled mirror optically coupled to receive the respective input beam and direct the respective input beam along the optical axis.

15. The spectrometer of claim 12, wherein:
each of the plurality of Michelson interferometers includes a respective first arm including the respective beam splitter and the respective fixed mirror and a respective second arm including the respective beam splitter and the moving mirror; and
each of the plurality of Michelson interferometers has a respective optical path difference between the first arm and the second arm.

16. The spectrometer of claim 8, wherein the plurality of interferometers are Fabry-Perot interferometers.

17. The spectrometer of claim 1, wherein each of the plurality of interferometers includes two Fabry-Perot interferometers coupled in series in the respective optical path, and further comprising:
an actuator coupled to at least one of the two Fabry-Perot interferometers, wherein the actuator is configured to vary a gap of at least one of the two Fabry-Perot interferometers.

18. The spectrometer of claim 1, wherein each of the plurality of interferometers is one of a Michelson interferometer, a Fabry-Perot interferometer or a Mach-Zehnder interferometer.

19. The spectrometer of claim 1, further comprising:
a respective modulator within each of the plurality of interferometers that is configured to vary the respective optical path of each of the plurality of interferometers.

20. The spectrometer of claim 19, wherein each modulator includes an electro-optic modulator or a thermo-optic modulator.

21. The spectrometer of claim 1, wherein the spectrometer is a Fourier Transform Infrared (FTIR) spectrometer.

22. A spectrometer, comprising:
an optical splitter optically coupled to receive a source light beam from a single source and configured to divide the source light beam into a plurality of input beams;
a plurality of scanning Michelson interferometers that are synchronized with respect to their motion and mechanically coupled in parallel, each of the plurality of interferometers optically coupled to the optical splitter to receive a respective single one of the plurality of input beams and configured to direct the respective input beam along a respective optical path to produce a respective one of a plurality of different outputs, each of the plurality of interferometers comprising a respective one of a plurality of silicon/air interface beam splitters, wherein the plurality of silicon/air interface beam splitters are physically isolated and spatially shifted from one another;
a plurality of detectors, each optically coupled to receive a respective one of the plurality of different outputs and configured to detect a respective one of a plurality of different interferograms; and
a processor coupled to the plurality of detectors to receive the plurality of different interferograms and configured to produce an overall interferogram as a concatenation of the plurality of different interferograms;
wherein a respective optical path difference range of each of the plurality of Michelson interferometers is shifted with respect to an adjacent optical path difference range of an adjacent one of the plurality of Michelson interferometers to increase a resolution of the spectrometer.

23. The spectrometer of claim 22, further comprising:
a substrate, the plurality of Michelson interferometers formed in a surface of the substrate.

24. The spectrometer of claim 22, wherein the plurality of Michelson interferometers includes a plurality of moving mirrors, and further comprising:

an actuator coupled to the plurality of moving mirrors for causing a displacement thereof that varies the respective optical path of each of the plurality of interferometers.

25. A spectrometer, comprising:
an optical splitter optically coupled to receive a source light beam from a single source and configured to divide the source light beam into a plurality of input beams;
a plurality of scanning interferometers that are synchronized with respect to their motion and mechanically and optically coupled in parallel, each of the plurality of interferometers optically coupled to the optical splitter to receive a respective single one of the plurality of input beams and configured to direct the respective input beam along a respective optical path, each providing a same optical path difference, to simultaneously produce a respective one of a plurality of identical outputs;
a plurality of detectors, each optically coupled to simultaneously receive a respective one of the plurality of identical outputs and configured to detect a respect one of a plurality of identical interferograms; and
a processor coupled to the plurality of detectors to receive the plurality of identical interferograms and configured to produce an overall interferogram as a sum of the plurality of identical interferograms.

26. A spectrometer, comprising:
an optical splitter optically coupled to receive a source light beam from a single source and configured to divide the source light beam into a plurality of input beams;
a plurality of scanning Michelson interferometers that are synchronized with respect to their motion and mechanically coupled in parallel, each of the plurality of interferometers optically coupled to the optical splitter to receive a single respective one of the plurality of input beams and configured to direct the respective input beam along a respective optical path to produce a respective one of a plurality of different outputs, wherein the plurality of interferometers comprise a common beam splitter shared between the plurality of interferometers, and each of the plurality of interferometers comprises a respective fixed mirror and a respective moving mirror, wherein each of the respective fixed mirrors and the respective moving mirrors comprises a curved surface;
a plurality of detectors, each optically coupled to receive a respective one of the plurality of different outputs and configured to detect a respective one of a plurality of different interferograms; and
a processor coupled to the plurality of detectors to receive the plurality of different interferograms and configured to produce an overall interferogram as a concatenation of the plurality of different interferograms.

* * * * *